United States Patent
Fujimoto et al.

(10) Patent No.: US 9,399,192 B2
(45) Date of Patent: Jul. 26, 2016

(54) CARBON DIOXIDE ABSORBER AND CARBON DIOXIDE SEPARATION/RECOVERY METHOD USING THE ABSORBER

(75) Inventors: Norikazu Fujimoto, Tokyo (JP); Kyouhei Hattori, Tokyo (JP); Fumihiko Yamaguchi, Tokyo (JP)

(73) Assignee: ASAHI KASEI KABUSHIKI KAISHA, Osaka-Shi (JP)

( * ) Notice: Subject to any disclaimer, the term of this patent is extended or adjusted under 35 U.S.C. 154(b) by 409 days.

(21) Appl. No.: 14/125,048

(22) PCT Filed: Jun. 8, 2012

(86) PCT No.: PCT/JP2012/064843
§ 371 (c)(1),
(2), (4) Date: Dec. 9, 2013

(87) PCT Pub. No.: WO2012/169634
PCT Pub. Date: Dec. 13, 2012

(65) Prior Publication Data
US 2014/0127119 A1 May 8, 2014

(30) Foreign Application Priority Data

Jun. 9, 2011 (JP) ................... 2011-129327
Jun. 9, 2011 (JP) ................... 2011-129438
Aug. 4, 2011 (JP) ................... 2011-171263

(51) Int. Cl.
*B01D 53/14* (2006.01)
*B01D 53/62* (2006.01)
*C01B 31/20* (2006.01)

(52) U.S. Cl.
CPC ............ *B01D 53/62* (2013.01); *B01D 53/1475* (2013.01); *B01D 53/1493* (2013.01); *C01B 31/20* (2013.01); *B01D 53/1425* (2013.01);
(Continued)

(58) Field of Classification Search
None
See application file for complete search history.

(56) References Cited

U.S. PATENT DOCUMENTS 1,964,808 A   7/1934   Bottoms
2,742,102 A   4/1956   Eichmann
(Continued)

FOREIGN PATENT DOCUMENTS

CN    1386566 A      12/2002
EP    0 588 178 A2    3/1994
(Continued)

OTHER PUBLICATIONS

Partial Supplementary European Search Report issued Nov. 18, 2014, in European Patent Application No. 12797425.1.
(Continued)

*Primary Examiner* — Jonathan Johnson
*Assistant Examiner* — Anita Nassiri Motlagh
(74) *Attorney, Agent, or Firm* — Birch, Stewart, Kolasch & Birch, LLP

(57) ABSTRACT

The present invention provides a carbon dioxide absorber capable of efficiently and stably removing carbon dioxide in a gas or solution. This carbon dioxide absorber contains an amine compound, a weakly acidic compound and water, the pKb value of the amine compound in an aqueous solution at 30° C. is 4.0 to 7.0, the pKa value of the weakly acidic compound in an aqueous solution at 30° C. is 7.0 to 10.0, and the weakly acidic compound is present in an amount within the range of 0.01 equivalents to 1.50 equivalents with respect to amino groups of the amine compound.

21 Claims, 10 Drawing Sheets

(52) U.S. Cl.
CPC ....... *B01D 2251/50* (2013.01); *B01D 2252/204* (2013.01); *B01D 2252/504* (2013.01); *B01D 2252/606* (2013.01); *B01D 2258/0291* (2013.01); *Y02C 10/04* (2013.01); *Y02C 10/06* (2013.01); *Y02P 20/129* (2015.11); *Y02P 20/152* (2015.11)

(56) References Cited

U.S. PATENT DOCUMENTS

| | | | |
|---|---|---|---|
| 3,848,057 | A | 11/1974 | Leder et al. |
| 4,137,294 | A | 1/1979 | Braizler et al. |
| 4,208,385 | A | 6/1980 | Robbins et al. |
| 4,336,233 | A | 6/1982 | Appl et al. |
| 6,500,397 | B1 | 12/2002 | Yoshida et al. |
| 6,521,662 | B2 | 2/2003 | Rho et al. |
| 2005/0202967 | A1 | 9/2005 | Hoefer et al. |
| 2006/0104877 | A1 | 5/2006 | Cadours et al. |
| 2006/0204425 | A1 | 9/2006 | Kamijo et al. |
| 2006/0248890 | A1 | 11/2006 | Iijima et al. |
| 2007/0283813 | A1 | 12/2007 | Iijima et al. |
| 2008/0050296 | A1 | 2/2008 | Tontiwachwuthikul et al. |
| 2009/0151566 | A1* | 6/2009 | Handagama ....... B01D 53/1425 95/187 |

FOREIGN PATENT DOCUMENTS

| | | |
|---|---|---|
| GB | 427394 | 4/1935 |
| JP | 52-63171 A | 5/1977 |
| JP | 62-197125 A | 8/1987 |
| JP | 7-313840 A | 12/1995 |
| JP | 2871334 B2 | 3/1999 |
| JP | 2871335 B2 | 3/1999 |
| JP | 2895325 B2 | 5/1999 |
| JP | 3197183 B2 | 8/2001 |
| JP | 2005-254212 A | 9/2005 |
| JP | 2005-254233 A | 9/2005 |
| JP | 2006-136885 A | 6/2006 |
| JP | 2006-232596 A | 9/2006 |
| JP | 2010-88982 A | 4/2010 |
| JP | 2011-506081 A | 3/2011 |
| JP | 2011-67792 A | 4/2011 |
| KR | 2001-0104451 A | 11/2001 |
| WO | WO 2007/081214 A1 | 7/2007 |
| WO | WO 2009/076328 A2 | 6/2009 |

OTHER PUBLICATIONS

Supplementary European Search Report for European Application No, 12797425.1, dated Mar. 16, 2015.

International Search Report, mailed Sep. 11, 2012, issued in PCT/JP2012/064843.

* cited by examiner

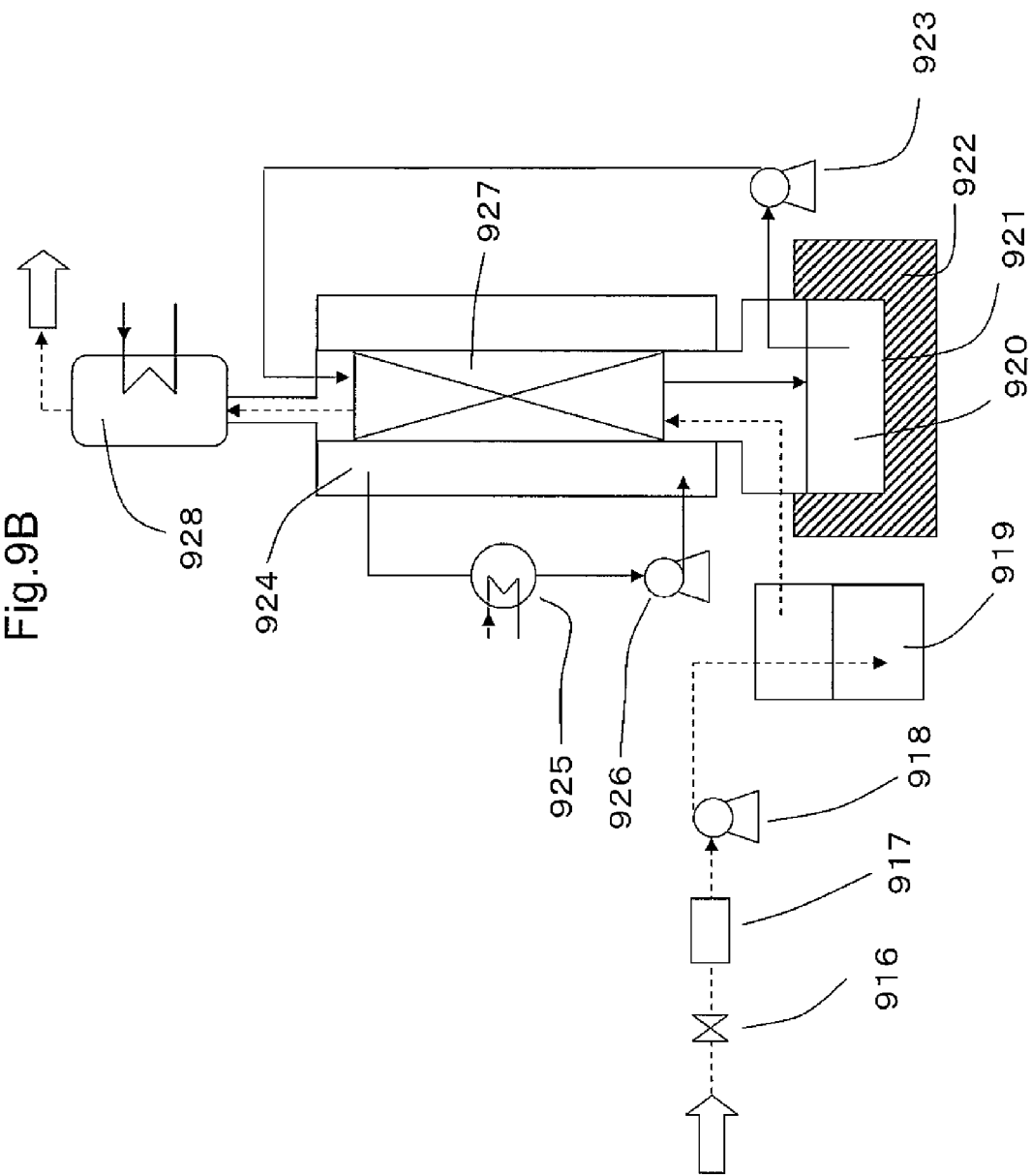

CARBON DIOXIDE ABSORBER AND CARBON DIOXIDE SEPARATION/RECOVERY METHOD USING THE ABSORBER

TECHNICAL FIELD

The present invention relates to a carbon dioxide absorber for absorbing and removing carbon dioxide contained in a gas, and more particularly, to a carbon dioxide absorber which can separate and recover carbon dioxide from a gas while saving energy. In addition, the present invention relates to a method for separating and recovering carbon dioxide from a gas containing carbon dioxide, such as combustion exhaust gas. Moreover, the present invention relates to a carbon dioxide separation and recovery apparatus that uses the carbon dioxide absorber, and to a carbon dioxide separation and recovery system that includes the apparatus.

TECHNICAL FIELD

Carbon dioxide present in the atmosphere has recently attracted attention as a substance that causes global warming. Therefore, methods have been examined for separating and recovering carbon dioxide present in flue gas from large-scale carbon dioxide emission sources such as thermoelectric power plants, steelworks or cement plants.

Carbon dioxide contained in a gas has conventionally been separated by various methods. For example, carbon dioxide has been removed in the production process of ammonia, and a method has commonly been employed whereby carbon dioxide is absorbed and removed by contacting with a basic absorber. Such methods are referred to as chemical absorption methods, and consist of chemically absorbing carbon dioxide with an absorber in an absorption tower, and then releasing and recovering the carbon dioxide by heating the absorber in a regeneration tower. This chemical absorption process enables highly efficient removal of carbon dioxide and recovery of highly pure carbon dioxide.

Since conventional technologies for separating and recovering carbon dioxide, such as a chemical absorption process, require a large amount of additional energy for separating carbon dioxide from absorbers, they have extremely serious economic shortcomings. In the case of chemical absorption process, the greatest amount of energy required for separation is the thermal energy used in the step for releasing the carbon dioxide from absorbers by heating the absorber that has absorbed carbon dioxide. Aqueous potassium carbonate solution or aqueous alkanolamine solutions such as aqueous monoethanolamine solution are used as conventional basic absorbers used in chemical absorption process. At present, studies are being conducted on absorbers that require lower levels of separation energy.

Patent Documents 1 to 4 describe methods for removing carbon dioxide from combustion exhaust gas using specific aqueous amine solutions. Although these methods improve on methods using an aqueous monoethanolamine solution, there is a need for further energy savings and higher efficiency.

In addition to amines, alkaline metal salts and the like have also been conventionally used as basic components present in absorbers. Patent Document 5 describes the use of alkaline metal phosphates, carbonates and borates. However, since alkaline metals are strongly basic, it has been difficult to save energy despite the strong acidity of acidic compounds.

Patent Document 6 describes a method for removing carbon dioxide from combustion exhaust gas that uses an aqueous diamine solution. Patent Document 7 describes a method for removing carbon dioxide that uses a mixed solution of an amine and piperazine. Although these methods improve on methods using an aqueous monoethanolamine solution, there is a desire for further energy savings and higher efficiency.

Incidentally, 1,3-bis(hydroxyethylamino)propan-2-ol is used in Patent Document 8. However, since this is used only as an intermediate substance for forming a cosmetic compound, its chemical properties relating to absorption of carbon dioxide are not known.

On the other hand, studies on how to save energy have also been conducted in terms of apparatuses. For example, Patent Document 9 describes a recovery system that heats a carbon dioxide absorber with a heat pump installed between an absorption column and a regeneration column. However, although this use of a heat pump achieves a certain degree of energy savings, when the equipment costs of this system are taken into consideration, the effects cannot be said to be adequate. In addition, Patent Document 10 describes an apparatus that heats a carbon dioxide absorber that has left a regeneration column using heat exchange with a high-temperature flue gas. In this apparatus as well, the thermal energy able to be used from the flue gas is unable to achieve adequate energy savings.

PRIOR ART DOCUMENTS

Patent Documents

[Patent Document 1] Japanese Patent Publication No. 2871334
[Patent Document 2] Japanese Patent Publication No. 2895325
[Patent Document 3] Japanese Patent Publication No.
[Patent Document 4] U.S. Unexamined Patent Publication No. 2008-0050296
[Patent Document 5] Japanese Unexamined Patent Publication No. 2006-136885
[Patent Document 6] Japanese Unexamined Patent Publication No. H07-313840
[Patent Document 7] Japanese Patent Publication No. 2871335
[Patent Document 8] U.S. Pat. No. 6,521,662
[Patent Document 9] Japanese Unexamined Patent Publication No. 2010-88982
[Patent Document 10] Japanese Unexamined Patent Publication No. 2006-232596

DISCLOSURE OF THE INVENTION

Problems to be Solved by the Invention

As was previously described, one issue facing carbon dioxide absorbers of the prior art is the need to increase energy savings during separation and recovery of carbon dioxide. In addition, since conventional absorbers also have the problem of a small amount of an amine compound being lost due to volatilization during contact with gas in the step for absorbing carbon dioxide, another issue is a reduction in the volatility of the amine compound contained in the carbon dioxide absorber.

In addition, in the case of a conventional chemical absorption process, regeneration is carried out by boiling the absorber by steam heating to a temperature of 110° C. to 130° C. Consequently, in this method, an extremely large amount of thermal energy is required. Moreover, since there is concern over thermal degradation of the amine compound contained in the carbon dioxide absorber in this regeneration step, another issue is greater stability of the carbon dioxide absorber.

Moreover, another important issue is metal corrosion caused by the basicity of the amine compound, which may restrict the materials used for the reactor. In addition, the carbon dioxide absorber may deteriorate due to the formation of decomposition products and oxidation products of the reactants in the reaction between an amine compound and carbon dioxide.

With the foregoing in view, an object of the present invention is to provide a carbon dioxide absorber for separating and recovering carbon dioxide contained in a gas while saving energy. In addition, an object of the present invention is to provide a carbon dioxide absorber that can be used stably by preventing volatilization of amine compounds and corrosion of metal. Moreover, an object of the present invention is to provide a method for separating and recovering carbon dioxide from a carbon dioxide-containing gas such as combustion exhaust gas.

In addition, an object of the present invention is to provide a carbon dioxide separation and recovery apparatus that uses the aforementioned carbon dioxide absorber, and a combustion exhaust gas treatment system that uses the carbon dioxide separation and recovery apparatus.

Means for Solving the Problems

As a result of conducting extensive studies, the inventors of the present invention found that, in a first configuration, the aforementioned objects are achieved by a carbon dioxide absorber that contains a specific amine compound, a specific weakly acidic compound and water.

Moreover, in a second configuration, the inventors of the present invention found that an amine compound having a specific chemical formula has superior reaction properties and desorption properties with respect to carbon dioxide, and has low levels of volatility and metal corrosion. In addition, the inventors of the present invention also succeeded in inventing a method for separating and recovering carbon dioxide capable of separating and recovering carbon dioxide contained in a gas while saving energy by using the aforementioned carbon dioxide absorber.

In addition, the inventors of the present invention also found that, by using the aforementioned carbon dioxide absorber, a carbon dioxide recovery apparatus having a specific configuration is able to separate and recover carbon dioxide contained in a gas both stably and with extremely high energy savings.

Namely, the present invention is as indicated below.

[1] A carbon dioxide absorber containing an amine compound, a weakly acidic compound and water;
wherein,
the pKb value of the amine compound in an aqueous solution at 30° C. is 4.0 to 7.0,
the pKa value of the weakly acidic compound in an aqueous solution at 30° C. is 7.0 to 10.0, and
the weakly acidic compound is present in an amount within the range of 0.01 equivalents to 1.50 equivalents with respect to amino groups of the amine compound.

[2] The carbon dioxide absorber described in [1], wherein the pH of the carbon dioxide absorber at 30° C. is 8.5 to 11.0.

[3] The carbon dioxide absorber described in [1] or [2], wherein the weakly acidic compound is a boron compound.

[4] The carbon dioxide absorber described in [3], wherein the boron compound is boric acid.

[5] The carbon dioxide absorber described in [4], wherein the content of the boric acid is within the range of 0.05 equivalents to 0.30 equivalents with respect to amino groups of the amine compound.

[6] The carbon dioxide absorber described in [5], wherein 25% to 99% of the boric acid neutralizes amino groups of the amine compound.

[7] The carbon dioxide absorber described in any of [1] to [6], wherein a compound having a pKb value in an aqueous solution at 30° C. of less than 4.0 is not contained.

[8] The carbon dioxide absorber described in any of [1] to [7], wherein the amine compound has a primary and/or secondary amino group.

[9] The carbon dioxide absorber described in any of [1] to [8], wherein the content of the amine compound is 30% by mass to 55% by mass, and the amount of the water is 40% by mass or more.

[10] The carbon dioxide absorber described in any of [1] to [9], further containing 1.0% by mass to 6.0% by mass of piperazine and/or 2-methylpiperazine, and containing the weakly acidic compound within the range of 0.5 moles to 2.0 moles with respect to 1 mole of the piperazine and/or 2-methylpiperazine.

[11] The carbon dioxide absorber described in any of [1] to [10], further containing diethanolamine.

[12] The carbon dioxide absorber described in any of [1] to [11], containing as the amine compound an amine compound represented by the following general formula (I):

[Chemical Formula 1]

$$HO-\underset{R_1}{\overset{H}{\underset{|}{C}}}-\overset{H_2}{C}-\overset{H}{N}-\overset{H_2}{C}-\underset{H}{\overset{OH}{\underset{|}{C}}}-\overset{H_2}{C}-\overset{H}{N}-\overset{H_2}{C}-\underset{R_2}{\overset{H}{\underset{|}{C}}}-OH \quad (I)$$

(wherein, $R^1$ and $R^2$ represent hydrogen atoms or alkyl groups having 1 to 4 carbon atoms).

[13] The carbon dioxide absorber described in [12], wherein both $R^1$ and $R^2$ in the formula are hydrogen atoms.

[14] A carbon dioxide absorber containing water and an amine that at least includes an amine compound represented by the following general formula (I):

[Chemical Formula 2]

$$HO-\underset{R_1}{\overset{H}{\underset{|}{C}}}-\overset{H_2}{C}-\overset{H}{N}-\overset{H_2}{C}-\underset{H}{\overset{OH}{\underset{|}{C}}}-\overset{H_2}{C}-\overset{H}{N}-\overset{H_2}{C}-\underset{R_2}{\overset{H}{\underset{|}{C}}}-OH \quad (I)$$

(wherein, $R^1$ and $R^2$ represent hydrogen atoms or alkyl groups having 1 to 4 carbon atoms).

[15] The carbon dioxide absorber described in [14], wherein both $R^1$ and $R^2$ in the formula are hydrogen atoms.

[16] The carbon dioxide absorber described in [14] or [15], containing the amine at 5.0% by mass to 80.0% by mass and containing water at 20.0% by mass to 95.0% by mass.

[17] The carbon dioxide absorber described in [16], wherein the amine contains diethanolamine at 20.0% by mass to 70.0% by mass in the amine.

[18] The carbon dioxide absorber described in [16], wherein the amine contains piperazine and/or 2-methylpiperazine at 1.0% by mass to 15.0% by mass in the amine.

[19] The carbon dioxide absorber described in [16], wherein the amine contains diethanolamine at 20.0% by mass to 65.0% by mass and contains piperazine and/or 2-methylpiperazine at 1.0% by mass to 15.0% by mass in the amine.

[20] The carbon dioxide absorber described in any of [1] to [19], further containing an antioxidant.

[21] The carbon dioxide absorber described in [20], wherein the antioxidant is a secondary antioxidant having one or more thiol groups.

[22] A method for regenerating a carbon dioxide absorber, comprising: a step for allowing carbon dioxide to be absorbed by the carbon dioxide absorber described in any of [1] to [21], and a step for releasing the carbon dioxide by heating the carbon dioxide absorber.

[23] A method for separating and recovering carbon dioxide, comprising: a step for allowing carbon dioxide to be absorbed by contacting a gas containing carbon dioxide with the carbon dioxide absorber described in any of [1] to [21], and a step for regenerating the carbon dioxide absorber by releasing the carbon dioxide by subsequently heating the carbon dioxide absorber.

[24] An apparatus for separating and recovering carbon dioxide, comprising:
an absorption tower for absorbing carbon dioxide by contacting a gas containing carbon dioxide with the carbon dioxide absorber described in any of [1] to [21], and
a regeneration tower for regenerating the carbon dioxide absorber by heating the carbon dioxide absorber that has absorbed carbon dioxide in the absorption tower with two or more regeneration heaters, and separating the carbon dioxide and an absorption liquid.

[25] The carbon dioxide recovery apparatus described in [24], further comprising a heat pump wherein at least one of the regeneration heaters is a heat exchanger using the high-pressure side, high-temperature coolant of the heat pump as a heat source, while the other regeneration heater is a reboiler that exchanges heat by using steam as a heat source.

[26] The carbon dioxide recovery apparatus described in [25], wherein the heat source of the heat pump is an aqueous medium at 40° C. to 70° C.

[27] The carbon dioxide recovery apparatus described in [26], wherein the heat source of the heat pump is a carbon dioxide absorber that has undergone a rise in temperature as a result of absorbing carbon dioxide in the absorption tower.

[28] The carbon dioxide recovery apparatus described in [27], comprising a means for using gaseous carbon dioxide obtained from the carbon dioxide absorber heated in the regeneration tower and water vapor components of the carbon dioxide absorber as heat sources of the heat pump.

[29] The carbon dioxide recovery apparatus described in any of [25] to [28], wherein a regeneration heater in the form of the heat exchanger using the high-pressure side, high-temperature coolant of the heat pump as a heat source is arranged between the top and bottom of the regeneration tower, and wherein the reboiler that exchanges heat by using steam as a heat source is arranged in the bottom of the regeneration tower.

[30] A combustion exhaust gas treatment system that separates and recovers carbon dioxide contained in combustion exhaust gas using the carbon dioxide recovery apparatus described in any of [24] to [29].

Effects of the Invention

According to the carbon dioxide absorber of the present invention, carbon dioxide in a gas or solution can be removed efficiently and stably. In addition, according to the carbon dioxide separation and recovery method of the present invention, carbon dioxide can be separated and recovered from gas in the manner of combustion exhaust gas while saving energy. In addition, according to the present invention, a carbon dioxide absorber can be provided that is able to prevent volatilization of amine compounds and corrosion of metal, and can be used stably. In addition, the present invention is able to provide a carbon dioxide removal method and separation/recovery method that demonstrate favorable efficiency during continuous use.

Without being bound by a particular theory, the reason why the carbon dioxide absorber of the present invention demonstrates the aforementioned effects is thought to be as indicated below. First, an explanation of the first configuration is provided. The absorption reaction of carbon dioxide by an amine compound is thought to proceed in the form of an equilibrium reaction between the following two reactions. One reaction is a reaction that goes through carbamic acid formed by a direct reaction between the nitrogen of an amino group and the carbon of carbon dioxide, while the other reaction is a reaction that goes through bicarbonate mediated by water molecules. Many primary and secondary amines are thought to form carbamic acid and subsequently form a carbonate. Since carbamic acid is unstable in water, it either reacts with another molecule of an amine compound to form carbamate or undergoes hydrolysis to form bicarbonate. Bicarbonates are further converted to carbonates corresponding to the base strength of the amine compound. However, the formation rate of bicarbonates is greater than the formation rate of carbonates in the case of almost all amine compounds. Tertiary amines are thought to form bicarbonates and carbonates since the reaction is unable to go through carbamic acid.

In other words, all absorption reactions of carbon dioxide by an amine compound are thought to be acid-base neutralization reactions, excluding the carbamic acid formation reaction. Thus, the formation of carbamates and the formation of bicarbonates go through a neutralization reaction between an amine compound and a weakly acidic compound. Accordingly, the majority of these reactions go through a single neutralization reaction each time a molecule of carbon dioxide is absorbed.

Since the carbon dioxide absorber of the present invention contains a weakly acidic compound, a portion of the amine compound and the weakly acidic compound are neutralized prior to absorption of carbon dioxide. When a compound having stronger acidity than the weakly acidic compound enters a system containing this carbon dioxide absorber, it is thought to replace the weakly acidic compound, and the compound having stronger acidity is thought to enter a neutral state with the amine compound. In other words, by neutralizing a compound having weaker acidity than carbamic acid or carbonic acid with the amine compound in the carbon dioxide absorber, an exchange reaction can take place during the carbon dioxide absorption reaction. This exchange reaction brings about a reduction in the heat of reaction, and in turn, a reduction in the amount of energy required during carbon dioxide desorption. This is the result of a decrease in the heat of reaction (enthalpy difference) corresponding to the neutralization reaction between the amine compound and the weakly acidic compound since this exchange reaction uses an amine compound in a neutralized state.

Thus, a first effect obtained by containing a weakly acidic compound in the carbon dioxide absorber of the present invention is the aforementioned reduction in the heat of reaction, and the reduction of an equal amount of energy from energy used during regeneration of the carbon dioxide absorber (desorption of carbon dioxide). In addition, there are other significant effects as well. The first is the relatively low level of metal corrosion due to the low basicity (pH) of the carbon dioxide absorber as a result of being in a neutralized state. Corrosion of metal has an effect on the materials of the reactor used in the carbon dioxide separation and recovery process, and has an effect on the durability of the overall process.

Another effect brought about by the weakly acidic compound is a reduction in the volatility of the amine compound. This is because an amine compound that has been neutralized and put into an ionized state has lower volatility than that in a non-ionized state. Since there is contact between liquid and gas during absorption of carbon dioxide, the amine compound present in the liquid volatilizes into the gas and is lost from the absorber depending on the degree of the vapor pressure. Consequently, it is necessary to remove the volatilized amine compound present in the gas as well as replenish the amine compound corresponding to the amount that has been lost. Therefore, lowering volatility of the amine compound is extremely significant.

Moreover, in the case of using boric acid as the weakly acidic compound, it was determined to have the effect of suppressing oxidation of the amine compound. When an amine compound is oxidized, the amine compound is further deactivated. This is because the oxidized amine compound cannot maintain its ability to absorb carbon dioxide, and carbonic acid components such as oxalic acid are formed as oxidative degradation products. Consequently, the use of boric acid as the weakly acidic compound is extremely advantageous in terms of suppressing oxidation of the amine compound.

The following provides an explanation of the effects of a second configuration. An amine compound having the structure represented by the following general formula (I):

[Chemical Formula 3]

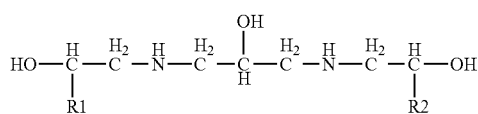

(wherein, $R^1$ and $R^2$ are selected from the group consisting of hydrogen atoms and alkyl groups having 1 to 4 carbon atoms) has similar reactivity with respect to carbon dioxide, to that of amine compounds used in known carbon dioxide absorbers, while it reacts with carbon dioxide at a lower heat of reaction. In addition, since the aforementioned amine compound allows a carbon dioxide desorption reaction to proceed at a relatively low temperature, it has superior carbon dioxide desorption performance. Since the thermal degradation of this amine compound is suppressed due to its low heat of reaction and its ability to desorb carbon dioxide at lower temperatures, a carbon dioxide absorber comprising this amine compound can be used repeatedly while saving energy. Without being bound by a particular theory, one reason for these reaction properties and desorption properties is thought to be that three hydroxyl groups and two amino groups interpose two carbon atoms, and are arranged at roughly symmetrical locations in terms of the molecular structure.

In addition, with respect to primary amines and secondary amines, two reactions consisting of a carbamate anion formation reaction and a bicarbonate formation reaction may be occur between carbon dioxide and amine groups. Thus, in comparison with tertiary amines, which are thought to only be able to undergo a bicarbonate formation reaction, primary and secondary amines exhibit high reactivity with respect to carbon dioxide. Among these two reactions, although the carbamate anion formation reaction has high heat of reaction, it also demonstrates high carbon dioxide absorption reactivity. In contrast, although the bicarbonate formation reaction demonstrates low carbon dioxide absorption reactivity, it has low heat of reaction.

The amine compound represented by the aforementioned general formula (I) is a secondary amine and is able to demonstrate high reactivity. Moreover, the aforementioned amine compound is able to react with carbon dioxide at a heat of reaction that is lower than that of known secondary amine compounds while maintaining its high reactivity. This is thought to be because the locations of the three hydroxyl groups and two amino groups are roughly symmetrical. Namely, this is thought to be because the state of water that bonds to the hydroxyl groups changes, before and after the reaction of one of the amine groups with a molecule of carbon dioxide, and further changes before and after the reaction of the other amino group with a second molecule of carbon dioxide. Since the effects of water, which hydrates the amine compound, change gradually depending on progression of the reaction between the amino groups and carbon dioxide, the two reactions between the amino groups and carbon dioxide can be carried out efficiently. As a result of this effect, the aforementioned amine compound is thought to be able to have low heat of reaction while maintaining high reactivity.

In addition, the aforementioned amine compound can provide a large difference in the amount of carbon dioxide absorbed for a small difference in temperature. This is thought to be because the two functional groups adjacent to the amino groups are methylene groups, thereby allowing molecular mobility to change considerably depending on temperature.

In this manner, an amine compound having a low heat of reaction while also demonstrating a large difference in the amount of carbon dioxide absorbed for a small difference in temperature was able to be found by adjusting the locations and numbers of hydroxyl groups, amino groups, methylene groups and the like.

Carrying out the carbon dioxide recovery apparatus and combustion exhaust gas treatment system of the present invention makes it possible to separate and recover carbon dioxide from a gas in the manner of combustion exhaust gas while saving energy. In addition, separation and recovery of carbon dioxide can be provided that demonstrates favorable efficiency during continuous operation.

An amine compound that uses the aforementioned second configuration is able to impart a large difference in the amount of carbon dioxide absorbed for a small difference in temperature. Since the carbon dioxide recovery apparatus of the present invention employs a configuration so as to increase the amount of desorbed carbon dioxide at a low temperature, it is able to demonstrate the properties of such an amine compound more effectively, thereby enabling separation and recovery of carbon dioxide to be carried out with extremely high energy savings.

BRIEF DESCRIPTION OF THE DRAWINGS

FIG. 9B is a schematic diagram of an apparatus for evaluating oxidative degradation of a carbon dioxide absorber.

BEST MODE FOR CARRYING OUT THE INVENTION

The following provides a detailed explanation of configurations and embodiments of the present invention.

<Carbon Dioxide Absorber>

Carbon dioxide absorbers are used for the purpose of absorbing and removing carbon dioxide, and a "carbon dioxide absorber" in the present application refers to an aqueous solution at least containing an amine compound, a weakly acidic compound and water. Here, the term "containing" includes the meaning of "obtained as a result of containing therein". Thus, in the aqueous solution, although the amine compound and the weakly acidic compound are at least partially present in a neutralized state, in the present description, the amine compound and the weakly acidic compound are described as respectively being contained in an aqueous solution. In addition, the amine compound refers to a compound having an amino group.

In addition to being in a liquid state, the carbon dioxide absorber of the present invention can also be in various states such as a liquid dispersion, emulsion, powder or swollen gel. In addition, it can also be used by loading on a porous support.

<Carbon Dioxide Absorber of First Configuration>

First, an explanation is provided of a first configuration. It is important to combine an amine compound and a weakly acidic compound in order to effectively demonstrate the effects of the carbon dioxide absorber of the present invention.

In the carbon dioxide absorber of the present invention, the carbon dioxide absorber per se preferably has a pH of 8.5 to 11.0 at 30° C. in order to efficiently absorb and remove carbon dioxide while demonstrating the aforementioned effects. The pH is more preferably 9.5 to 11.0 and most preferably 10.0 to 11.0. The pH of the absorber per se is important because it has an effect on the equilibrium with carbon of the carbon dioxide incorporated into the system. However, since the pH of the absorber is directly involved with the pKb value and concentration of the amine compound as well as the pKa value and concentration of the weakly acidic compound, these are preferably adjusted accordingly. In general, the concentration and pH of a weak acid when titrating a weak base with a weak acid are represented by the following formula (1):

[Equation 1]

$$Ca = \left(\frac{[H^+]}{Ka} + 1\right)\left(\frac{Cb}{\frac{Kw}{Kb[H^+]} + 1} - \frac{Kw}{[H^+]} + [H^+]\right) \quad \text{Formula 1}$$

(wherein, Ca represents the concentration of the weak acid, Cb represents the concentration of the weak base, Ka represents the dissociation constant of the weak acid, Kb represents the dissociation constant of the weak base, Kw represents the dissociation constant of water, and [H$^+$] represents proton concentration).

Figure 1:
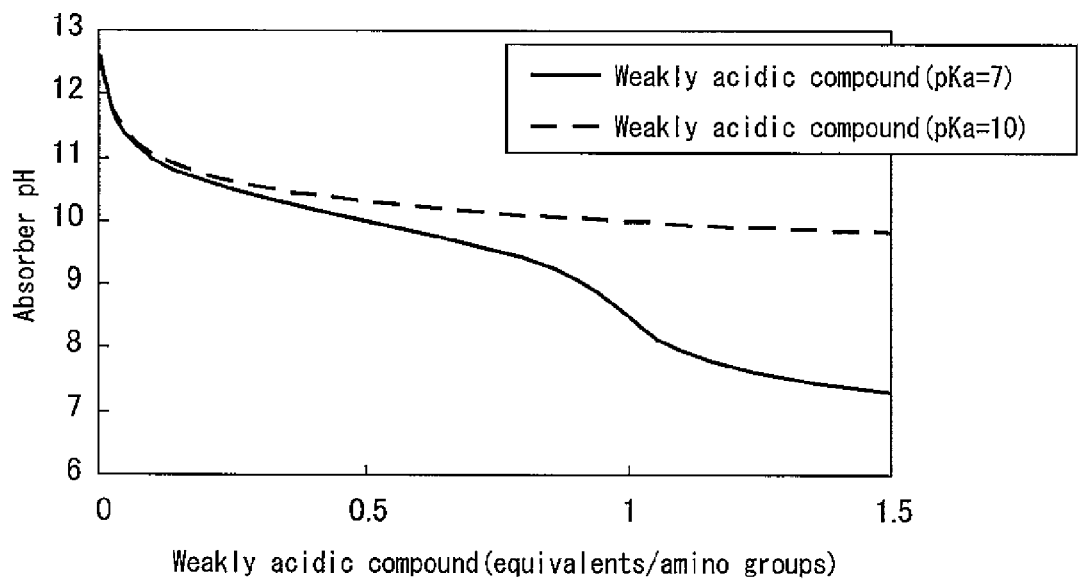
FIG. 1 is a graph of the pH of carbon dioxide absorbers obtained by calculating in the case of changing the amount of weakly acidic compounds having pKa values of 7.0 and 10.0 contained in an aqueous solution (4 moles/liter) of an amine compound having a pKb value of 4.0.
Figure 2:
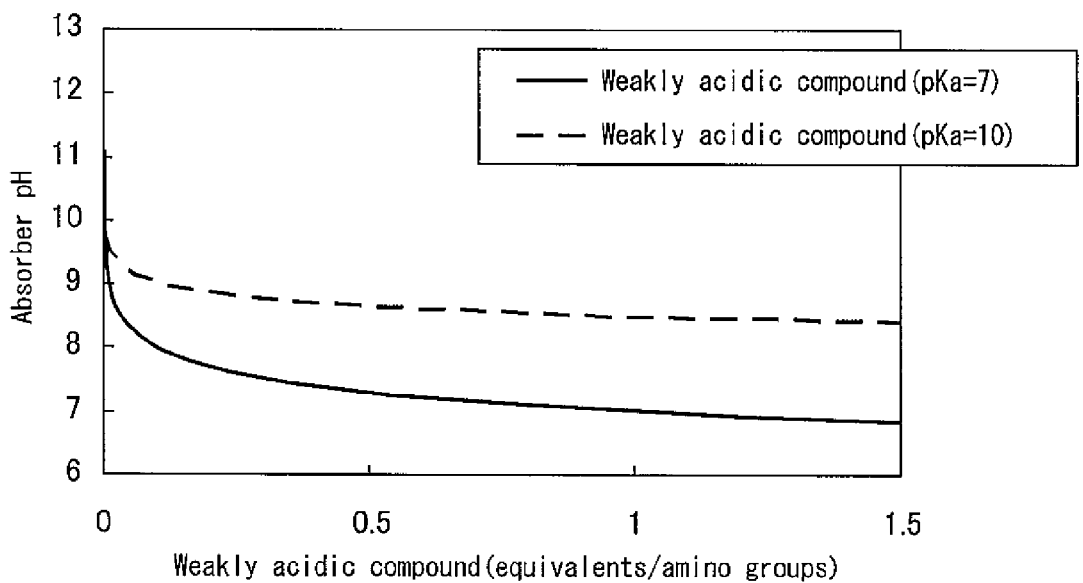
FIG. 2 is a graph of the pH of carbon dioxide absorbers obtained by calculating in the case of changing the amount of weakly acidic compounds having pKa values of 7.0 and 10.0 contained in an aqueous solution (4 moles/liter) of an amine compound having a pKb value of 7.0.

As an example, calculation results based on formula (1) in the case of containing weakly acidic compounds having pKa values of 7.0 and 10.0 in aqueous solution (4 moles/liter) of amine compounds having pKb values of 4.0 and 7.0 are shown in the graphs of FIG. 1 and FIG. 2.

In these graphs, the amount of weakly acidic compound relative to amino groups is plotted on the horizontal axis, while pH of the absorber is plotted on the vertical axis. For example, in the case of an amine compound having a pKb value of 4.0, a weakly acidic compound having a pKa value of 7.0 should be added within a range of 0.09 equivalents to less than 1.00 equivalents in order to make the pH to be from 8.5 to 11.0. Alternatively, a weakly acidic compound having a pKa value of 10.0 should be within a range of 0.10 equivalents or more. On the other hand, in the case of an amine compound having a pKb value of 7.0, a weakly acidic compound having a pKa value of 7.0 should be added within a range of 0.03 equivalents or less in order to make the pH to be 8.5 or higher. Alternatively, a weakly acidic compound having a pKa value of 10.0 should be added within a range of 0.01 equivalents to less than 1.00 equivalents. In addition, it can be understood from these calculation results that a decrease in pH can occur suddenly even in a region where an extremely small amount of weakly acidic compound is present. Furthermore, an equivalent refers to a molar equivalent.

Neutralizing amount and exchange efficiency are affected by the balance between the base strength of the amine compound and the acid strength of the weakly acidic compound. In order to stably demonstrate the effects of the present invention, the base strength (pKb value in an aqueous solution at 30° C.) of the amine compound is 4.0 to 7.0, while the acid strength (pKa value in an aqueous solution at 30° C.) of the weakly acidic compound is 7.0 to 10.0. Preferably, the base strength of the amine compound is 4.5 to 6.5 and the acid strength of the weakly acidic compound is 7.5 to 9.5. More preferably, the base strength of the amine compound is 4.7 to 6.0 and the acid strength of the weakly acidic compound is 8.0 to 9.3.

* Amine Compound

There are no particular limitations on the amine compound able to be used in the carbon dioxide absorber of the present invention provided the base strength of the amine compound is 4.0 to 7.0 when represented as the pKb value in an aqueous solution at 30° C. as previously described. In addition, an amine compound having a low vapor pressure or high boiling point is preferable, and that having a lower heat of reaction with carbon dioxide is preferable.

Although varying according to the acid strength of the weakly acidic compound as previously described, the base strength of the amine compound when represented as the pKb value in an aqueous solution at 30° C. is within the range of 4.0 to 7.0, preferably within the range of 4.5 to 6.5, and even more preferably within the range of 4.7 to 6.0. If the pKb value is within these ranges, the amine compound adequately reacts with carbon dioxide and the absorbed carbon dioxide is easily desorbed. Moreover, if the pKb value is within these ranges, the amine compound is able to adequately neutralize the weakly acidic compound, and an exchange reaction is able to occur while maintaining a neutralized state.

The pKb value of the amine compound in an aqueous solution at 30° C. is determined by measuring pH in an aqueous solution. This basically indicates the pKb value of amino groups. In the present invention, in the case of an amine compound having a plurality of amino groups, the average pKb value determined by measuring pH in an aqueous solution is used as the pKb value of that amine compound.

An amino group of the amine compound in the present invention refers to any of primary to tertiary amino groups or cyclic amino groups. The amine compound may have a plurality of amino groups, and in that case, the number of amino groups is an integral multiple with respect to the amine compound.

The content of the amine compound is arbitrarily determined corresponding to the usage conditions of the carbon dioxide absorber. Although the amount of carbon dioxide absorbed is naturally lower the lower the content of the amine compound, the absorbed amount conversely reaches a maximum even if the content is increased. The reasons for this consist of the absorption reaction being subjected to limitations depending on the equilibrium constant since the reaction is an equilibrium reaction, and a decrease in the amount of water since water molecules are involved in the reaction. Although varying according to the molecular weight of the amine compound, in terms of practical use, the content thereof is preferably 30% by mass to 55% by mass, more preferably 35.0% by mass to 50.0% by mass, and most preferably 40.0% by mass to 50.0% by mass.

Specific examples of amine compounds able to be used include amine compounds having a single primary amino group such as monoethanolamine, 2-amino-2-methyl-1-propanol, 3-amino-1-propanol or 1-amino-3-butanol, amine compounds having a single secondary amino group such as 2-methylaminoethanol, 2-ethylaminoethanol, 2-isopropylaminoethanol, diethanolamine, 2-methylaminoisopropanol or 2-ethylaminoisopropanol, amine compounds having a single tertiary amino group such as 2-dimethylaminoethanol, 2-diethylaminoethanol, 3-dimethylamino-1-propanol, 4-dimethylamino-1-butanol, 2-dimethylamino-2-methyl-1-propanol, N-ethyl-N-methylethanolamine, dimethyldiethanolamine, ethyldiethanolamine or triethanolamine, amine compounds having two primary amino groups such as ethylenediamine, hexamethylenediamine or 2-hydroxy-1,3-propanediamine, amine compounds having two secondary amino groups such as N,N'-bis(2-hydroxyethyl)ethylenediamine, N,N'-bis(2-hydroxyethyl)-2-hydroxy-1,3-propanediamine or N,N'-bis(2-hydroxyethyl)hexamethylenediamine, amine compounds having two secondary cyclic amino groups such as piperazine, 2-methylpiperazine or 2,5-dimethylpiperazine, amine compounds having a secondary cyclic amino group and a tertiary cyclic amino group such as 2-hydroxyethylpiperazine, and, amine compounds having a plurality of amino groups such as diethylenetriamine or tetraethylenepentamine. Two or more types of these amine compounds can be used in the carbon dioxide absorber of the present invention.

Another effect of neutralization with the weakly acidic compound was determined to be demonstrated in an embodiment in the case of using amine compounds having primary and secondary amino groups. Namely, the heat of reaction was able to be lowered considerably in this embodiment. This is thought to be due to the reason indicated below. As was previously described, primary and secondary amino groups undergo a reaction that forms carbamic acid by reacting directly with the carbon of carbon dioxide. This reaction proceeds rapidly and occurs prior to the reaction that forms bicarbonate. Since carbamic acid per se is unstable in water, it further reacts with another molecule of the amine compound to form carbamate. Since this reaction proceeds in two steps, in comparison with the reaction that forms bicarbonate, the heat of reaction per molecule of carbon dioxide ends up being higher by an amount roughly equal to the heat of reaction from the reaction that forms the carbamate. However, in the absorber of the present invention, amino groups of the amine compound are in a neutralized state with a weakly acidic compound. As a result, the reaction that forms carbamic acid is suppressed, and instead the reaction ratio of the reaction that forms bicarbonate increases. As a result, decreases in the heat of reaction are thought to occur simultaneously due to not only the aforementioned heat of neutralization between the amine compound and the weakly acidic compound, but also as a result of changing the carbamate and bicarbonate formation ratios. Thus, the heat of reaction in such an embodiment can be lowered considerably, and as a result thereof, a carbon dioxide absorber is obtained that can be regenerated while saving energy.

In addition, in another embodiment, an amine compound having low water solubility can be used. Since there are normally is an upper limit on concentration when using an amine compound having low water solubility in the manner of piperazine in the state of an aqueous solution, the resulting absorber is unable to demonstrate high absorption performance when using such an amine compound alone. On the other hand, since an amine compound that is in a neutralized state with a weakly acidic compound as in the present invention forms ammonium ions resulting in improved water solubility, an amine compound having low water solubility can be used at higher concentrations than normal.

In another embodiment, the performance of the absorber can be improved by further adding a secondary amine compound in the form of a compound such as piperazine having a secondary amino group having an extremely high amine value. The content of these secondary amine compounds in the carbon dioxide absorber is preferably 1.0% by mass to 6.0% by mass, and more preferably 2.0% by mass to 5.0% by mass. When a fixed amount of piperazine is added to an absorber containing another amine compound as the main amine compound, the absorption rate and absorbed amount can be improved to a greater degree than in the case of using the main amine compound or piperazine alone. This is thought to be because both of the amino groups of piperazine absorb carbon dioxide by going through carbamic acid, and the main amine compound and two carbamates are formed in a form that neutralizes the carbamic acid. This type of phenomenon occurs in cases in which the main amine compound has weaker basicity than piperazine and is present in an adequate amount in terms of an equilibrium reaction. Although there are cases in which the heat of reaction is much larger when compared with the main amine compound alone, this is within an acceptable range when considering the improvement in absorption rate.

In an embodiment of the case in which piperazine is further added to an absorber containing another main amine compound and weakly acidic compound, the effects of improving absorption rate and absorbed amount was determined to be obtained simultaneous to the effect of lowering the heat of reaction attributable to the weakly acidic compound. In particular, in the case of using the weakly acidic compound within a range of 0.5 moles to 2.0 moles with respect to 1 mole of piperazine, absorption rate improved remarkably in comparison with conventional absorbers. As a result, in this embodiment, by using an amine compound having low heat of reaction but slow absorption rate, an absorber can be provided that can be separated and recovered with greater energy savings.

* Amine Compound-Compound A

The present invention is able to demonstrate particularly remarkable effects in the case of using an amine compound having a structure represented by the following general structural formula (I) used particularly in the second configuration among the aforementioned amine compounds (to be referred to as "Compound A"). The following provides an explanation of the amine compound represented by general formula (I).

[Chemical Formula 4]

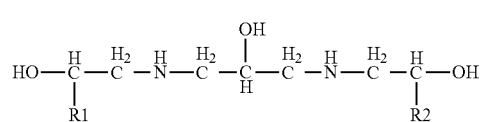

(I)

$R^1$ and $R^2$ in the aforementioned general structural formula (I) of the amine compound of Compound A are selected from the group consisting of hydrogen atoms and alkyl groups having 1 to 4 carbon atoms. $R^1$ and $R^2$ are preferably hydrogen atoms or alkyl groups having 1 to 4 carbon atoms from the viewpoints of the degree of hydrophobicity and maintaining a hydrated state. $R^1$ and $R^2$ are more preferably selected from the group consisting of hydrogen atoms and alkyl groups having 1 to 3 carbon atoms, even more preferably selected from the group consisting of hydrogen atoms, methyl groups and ethyl groups, and most preferably selected from the group consisting of hydrogen atoms and methyl groups.

Specific examples of Compound A represented by general structural formula (I) include 1,3-bis(2-hydroxyethylamino) propan-2-ol, 1-(2-hydroxyethylamino)-3-(2-hydroxypropylamino)propan-2-ol, 1-(2-hydroxyethylamino)-3-(2-hydroxybutylamino)propan-2-ol, 1-(2-hydroxyethylamino)-3-(2-hydroxypentylamino)propan-2-ol, 1-(2-hydroxyethylamino)-3-(2-hydroxyhexylamino) propan-2-ol, 1,3-bis(2-hydroxypropylamino)propan-2-ol, 1-(2-hydroxypropylamino)-3-(2-hydroxybutylamino)propan-2-ol, 1-(2-hydroxypropylamino)-3-(2-hydroxypentylamino) propan-2-ol, 1-(2-hydroxypropylamino)-3-(2-hydroxyhexylamino) propan-2-ol, 1,3-bis(2-hydroxybutylamino)propan-2-ol, 1-(2-hydroxybutylamino)-3-(2-hydroxypentylamino)propan-2-ol, 1-(2-hydroxybutylamino)-3-(2-hydroxyhexylamino)propan-2-ol, 1,3-bis(2-hydroxypentylamino)propan-2-ol, 1-(2-hydroxypentylamino)-3-(2-hydroxyhexylamino) propan-2-ol and 1,3-bis(2-hydroxyhexylamino)propan-2-ol.

Among these, since 1,3-bis(2-hydroxyethylamino)propan-2-01, in which $R^1$ and $R^2$ are both hydrogen atoms, has a short length for the hydrophobic group in the form of the terminal alkyl group, it has a structure in which the hydration effects of the hydroxyl groups act more effectively. Thus, this amine compound has particularly superior balance between carbon dioxide reactivity and heat of reaction among the compounds of Compound A.

In addition to that described above, Compound A demonstrates strong hydrogen bonding by the hydroxyl groups while also being characterized by having weak basicity per amino group. Moreover, due to the strong hydrogen bonding, it has low volatility, and demonstrates superior performance in applications in which volatility is an important issue. For example, 1,3-bis(2-hydroxyethylamino)propan-2-ol has a vapor pressure of 0.04 mPa at 25° C. and a boiling point of 379° C., resulting in extremely low volatility. Thus, Compound A is extremely useful since it is able to reduce volatilization loss when contacting a gas. In addition, the weak basicity per amino group is attributable to the diamine structure. Due to its weak basicity, Compound A is lowly corrosive with respect to metal and demonstrates superior performance in applications in which metal corrosion is an important issue. For example, the pKb value of 1,3-bis(2-hydroxyethylamino) propan-2-ol in an aqueous solution at 30° C. is 6.3, indicating weak basicity when compared with the pKb value of 4.7 at 30° C. of monoethanolamine. Thus, Compound A is extremely useful since it allows a wide range of materials to be selected for use in the reactor.

The aforementioned Compound A can be used with other amine compounds.

The same amine compounds as the amine compounds described in the second configuration to be subsequently described can be used for the other amine compounds, and particular examples thereof include diethanolamine, piperazine and 2-methylpiperazine. The added amounts of these amine compounds can be determined based on the added amounts used in the second configuration to be subsequently described.

The following provides an explanation of a method for producing the aforementioned Compound A.

There are no particular limitations on the method used to produce the aforementioned Compound A, and a known method can be used. A specific example of a production method consists of reacting two equivalents of an arbitrary primary amine compound with epichlorohydrin or 1,3-dichoro-2-propanol. In this method, an arbitrary amine compound represented by the aforementioned general structural formula (I) can be formed by selecting the structure of the primary amine compound. Specific examples of primary amines that can be reacted include monoethanolamine, 1-amino-2-propanol, 1-amino-2-butanol, 1-amino-3-pentanol and 1-amino-2-hexanol. Two equivalents of one type of these primary amine compounds may be reacted, or one equivalent of one type may be reacted followed by reacting one equivalent of another type. Naturally, two or more types of primary amine compounds may be reacted simultaneously to obtain a mixture of Compound A.

More specifically, the following describes an example of a method for forming 1,3-bis(2-hydroxyethylamino)propan-2-ol. 2 or more moles of monoethanolamine are mixed with 1 mole of epichlorohydrin or 1,3-dichloro-2-propanol in an alcohol-based solvent and the like. In order to avoid sudden generation of heat, this solution is stirred while cooling at room temperature followed by heating as necessary. The temperature at this time is about 40° C. to 100° C. Following the reaction, sodium hydroxide or potassium hydroxide is added to the solution and salt is precipitated and removed by filtration and the like, followed by removing the surplus primary amine compound by filtration or vacuum distillation and the like to obtain the product. More specifically, 1,3-bis(2-hydroxyethylamino) propan-2-ol can be prepared in the manner described below.

20.0 g of monoethanolamine and 30.0 mL of ethanol were charged into a reaction vessel equipped with a stirrer, condenser and thermometer followed by heating to 30° C. with an oil bath. Next, a mixture of 12.6 g of epichlorohydrin and 5.0 mL of ethanol was dropped in over the course of 5 minutes while stirring followed by allowing to react while stirring for 20 minutes following completion of dropping. Moreover, the reaction was allowed to proceed for 8 hours while stirring at 80° C. Following the reaction, the liquid was cooled to 30° C. followed by further dropping in a mixture of 5.4 g of sodium hydroxide and 30.0 mL of methanol over the course of 5 minutes while stirring, and allowing to react for 20 minutes following completion of dropping while stirring. After removing the sodium chloride that formed by filtration, the reaction solvent was removed by distillation. The resulting solid was filtered followed by washing with ethanol to obtain 1,3-bis(2-hydroxyethylamino)propan-2-ol. The formation of 1,3-bis(2-hydroxyethylamino)propan-2-ol was confirmed by $^{13}$C-NMR.

Another example of a production method consists of reacting 2 equivalents of an arbitrary epoxy compound with 1,3-diamino-2-propanol. In this method, an alkane compound having a terminal epoxy group can be used for the epoxy compound, examples of which include ethylene oxide, propylene oxide, 1,2-butylene oxide, 1,2-epoxypentane and 1,2-epoxyhexane.

* Weakly Acidic Compound

There are no particular limitations on weakly acidic compounds able to be used in the carbon dioxide absorber of the present invention provided the acid strength thereof when represented as the pKa value in an aqueous solution at 30° C. is 7.0 to 10.0.

Although the acid strength of the weakly acidic compound is basically weaker than carbamic acid or carbonic acid, if excessively weak, the neutralization reaction with the amine compound does not proceed adequately. On the other hand, in the case of an amine compound having basicity within the aforementioned ranges, since the reaction from bicarbonate to carbonate only proceeds slightly, acid strength of the weakly acidic compound is required to be stronger than that of bicarbonate ion. For this reason, the acid strength of the weakly acidic compound when represented as the pKa value in an aqueous solution at 30° C. is within the range of 7.0 to 10.0, preferably within the range of 7.5 to 9.5, and even more preferably within the range of 8.0 to 9.3.

The pKa value of the weakly acidic compound in an aqueous solution at 30° C. is determined by measuring pH in an aqueous solution, and indicates the proton dissociation constant in an aqueous solution. The weakly acidic compound may demonstrate acidity by reacting with water molecules in the manner of boric acid and the like.

The content of the weakly acidic compound is also important in terms of obtaining the aforementioned effects. Namely, this is because the amounts of the weakly acidic compound and the amine compound in a neutralized state are proportional to the magnitude of the decrease in the heat of reaction. In the case where the amount of the weakly acidic compound is excessively low, an adequate reduction in the heat of reaction cannot be expected. On the other hand, if the amount of the weakly acidic compound is excessively high, the pH of the carbon dioxide absorber leans toward the acidic side and has a considerable effect on the equilibrium constant of the carbon dioxide absorption reaction, thereby inviting a considerable decrease in the absorbed amount as a result thereof. For the above reasons, the content of the weakly acidic compound is within the range of 0.01 equivalents to 1.50 equivalents, more preferably within the range of 0.03 equivalents to 1.0 equivalents, even more preferably within the range of 0.03 equivalents to 0.5 equivalents, and most preferably within the range of 0.05 equivalents to 0.3 equivalents, with respect to the amino groups of the amine compound.

As is clear from the aforementioned reaction mechanism, there are no particular limitations on the weakly acidic compound provided it is within a range that satisfies the aforementioned conditions. Specific examples include weakly acidic boron compounds, phenol derivatives, 2,4-pentadione and derivatives thereof. The weakly acidic boron compounds include boric acid; trimethyl borate, triethyl borate; borate esters such as boric acid ethylene glycol ester, boric acid glycerin ester, boric acid monobutyl ester or boric acid monophenyl ester; boronic acids such as methylboronic acid, ethylboronic acid, butylboronic acid or phenylboronic acid; and boronic acid esters such as methylboronic acid ethylene glycol ester, methylboronic acid dimethyl ester or butylboronic acid ethylene glycol ester. Weakly acidic boron compounds are used more preferably, and boric acid, borate esters, boronic acids and boronic acid esters are used even more preferably. Among these, boric acid is used most preferable in consideration of its low molecular weight, water solubility, volatility, stability, production cost and the like. In addition, the pKa value of the weakly acidic compound can be lowered within the pKa range of the present invention by containing an alcohol together with boric acid in the absorber to convert a portion of the boric acid to borate ester.

* Water

This type of acid-base neutralization reaction is premised on an equilibrium reaction in an aqueous solution, and the presence of water is therefore required in the carbon dioxide absorber of the present invention. The water content in the carbon dioxide absorber is preferably within the range of 40% by mass or more, more preferably within the range of 45% by mass to 70% by mass, and most preferably within the range of 50% by mass to 65% by mass.

In the carbon dioxide absorber of the present invention, a solvent other than water may be further contained as necessary. However, solvents having a high vapor pressure or low boiling point are undesirable since they volatilize during absorption of carbon dioxide. In addition, solvents demonstrating high reactivity with amines are also not desirable. Solvents having low specific heat and favorable thermal conductivity are preferable from the viewpoint of saving energy.

Specific examples of solvents that may be contained include polyvalent alcohols such as ethylene glycol, propylene glycol, glycerin, 1,3-butanediol or 1,4-butanediol, alcohols having 4 or more carbon atoms such as butanol, pentanol or cyclohexanol, amides such as 2-pyrrolidone, N-methylpyrrolidone or dimethylacetoamide, carbonates such as ethylene carbonate, propylene carbonate or diethyl carbonate, and silicon oil.

* Other Components

In addition, known antifoaming agents, dispersion stabilizers, surfactants, viscosity adjusters or corrosion inhibitors and the like can be added as other components corresponding to the form of the carbon dioxide absorber. In addition, basic compounds having a pKb value of less than 4 can also be contained provided they are contained within a range that does not impair the effects of the weakly acidic compound, while conversely, basic compounds having a pKb value in excess of 7 can also be contained.

More specifically, in the case of containing a basic compound having a pKb value of less than 4, since it preferentially neutralizes with the weakly acidic compound, the basic compound must be present in an amount sufficiently lower than the amount of the weakly acidic compound so that the weakly acid compound is able to adequately neutralize with the amine. The carbon dioxide absorber of the present preferably does not contain a basic compound having a pKb value of less than 4. Similarly, an acidic compound having a pKa value of less than 7 can also be contained in the carbon dioxide absorber of the present invention provided it is contained within a range that does not significantly impair the effects of the amine compound. Furthermore, An acidic compound having a pKa value in excess of 10 can also be contained in the carbon dioxide absorber of the present invention provided it is contained within a range that does not significantly impair the effects of the amine compound. More specifically, in the case of containing an acidic compound having a pKa value of less than 7, the absorbed amount of carbon dioxide decreases since it preferentially neutralizes with the amine compound. Thus, the amount of that acidic compound is required to be sufficiently lower than the amount of the amine compound. In addition, a salt of the aforementioned amine compound or weakly acidic compound can also be contained.

In addition, a known antioxidant can also be added for the purpose of suppressing deterioration of the carbon dioxide absorber. Examples of antioxidants include radical scavengers in the form of primary antioxidants such as phenol-based antioxidants, peroxide decomposers in the form of secondary antioxidants such as phosphorous-based antioxidants or sulfur-based antioxidants, and other antioxidants. More specifically, examples of phenol-based primary antioxidants include octadecyl-[3-(3,5-di-tert-butyl-4-hydroxyphenyl) propionate], 4,6-bis(octylthiomethyl)-o-cresol, butylated hydroxytoluene, dioctyldiphenylamine and 4,4'-thiobis(3-methyl-6-tert-butylphenol). Examples of phosphorous-based secondary antioxidants include 9,10-dihydro-9-oxa-10-phosphaphenanthrene-10-oxide, tris(2,4-di-tert-butylphenyl)phosphite, bis(2,4-di-tert-butyl-6-methylphenyl)ethylphosphite, nitrilotris(methylphosphonic acid) and diethylenetriamine pentakis(methylphosphonic acid). Examples of sulfur-based secondary antioxidants include pentaerythritol tetrakis[3-(3,5-di-tert-butyl-4-hydroxyphenyl)propionate], β-mercaptopropionic acid, 2,2'-thiodiethanol, didodecyl-3,3'-thiodipropionate, bismuthiol, 2-mercaptobenzimidazole, 2-mercapto-1-methylimidazole, 2-mercapto-4-methylimidazole, 2-mercapto-4-phenylimidazole, 2-mercapto-5-phenylimidazole, 2-mercapto-5-methylbenzimidazole, 2-mercaptobenzothiazole, 2-mercaptobenzoxazole and cysteine. Examples of other antioxidants include ascorbic acid, sodium ascorbate, diethylenetriamine pentaacetate and sodium thiosulfate. Among these, sulfur-based secondary antioxidants having one or more thiol groups are particularly preferable.

Among these antioxidants, in the case of using a gas containing oxygen in particular, 9,10-dihydro-9-oxa-10-phosphaphenanthrene-10-oxide, bismuthiol, 2-mercaptobenzimidazole, 2-mercapto-4-methylimidazole, 2-mercaptobenzothiazole, 2-mercaptobenzoxazole, diethylenetriamine pentaacetate and sodium thiosulfate are particularly preferable due to their superior antioxidative effects and solubility in aqueous amine solutions.

Although there are no particular limitations thereon, the added amount of these antioxidants is preferably such that they are contained within the range of 100 ppm to 10000 ppm and more preferably within the range of 1000 ppm to 5000 ppm.

The following indicates absorption properties of an absorber having the composition indicated below as a specific example of a carbon dioxide absorber of the first configuration.

* Absorber Composition 1,3-bis(2-hydroxyethylamino)propan-2-ol: 21.0% by mass

Diethanolamine: 24.7% by mass

Piperazine: 3.2% by mass

Boric acid: 2.3% by mass

Water: 48.8% by mass

This absorber is able to separate and recover carbon dioxide by absorbing and releasing carbon dioxide at a recovery rate of about 70 g ($CO_2$)/L (absorber) from gas containing 15% carbon dioxide in the case of an absorption tower temperature of 40° C. and regeneration tower temperature of 100° C. In addition, the heat of reaction during absorption and release at this time is extremely low at 69 kJ/mol $CO_2$. The specific heat of the absorber is low at 3.4 J/g·K, and the amount of heat required for raising the temperature is also comparatively low.

<Carbon Dioxide Absorber of Second Configuration>

The following provides an explanation of a second configuration. The carbon dioxide absorber of this second configuration contains an amine containing at least one type of amine compound and water. This amine includes at least one type of amine compound selected from compounds of Compound A. In this configuration, the effects of the present invention are demonstrated without containing a weakly acidic compound.

As was previously described, in the reaction between an amine compound and carbon dioxide in a carbon dioxide absorber, the amount of the amine compound is an important factor. Therefore, the amine content of the carbon dioxide absorber of the second configuration of the present invention is preferably 5.0% by mass to 80.0% by mass and more preferably 20.0% by mass to 60.0% by mass. In addition, the water content in the carbon dioxide absorber is preferably 20.0% by mass to 95.0% by mass, and more preferably 40.0% by mass to 80.0% by mass. If within these ranges, the carbon dioxide absorber adequately demonstrates its function and reactivity is favorable since hydration of the amine compound and water proceeds adequately.

* Amine

As was previously described, the amine in the carbon dioxide absorber of the second configuration of the present invention contains at least one type of amine compound. The performance of Compound A, which enables reaction with carbon dioxide at low heat of reaction and allows the carbon dioxide desorption reaction to be carried out at a low temperature, makes it superior for use as a carbon dioxide absorber. As a result, a carbon dioxide absorber can be provided that is able to stably and continuously separate and recover carbon dioxide while saving energy.

The ratio of Compound A in the amine is preferably 30.0% by mass to 100.0% by mass. If within this range, the effects of Compound A in the carbon dioxide absorber are comparatively effective.

Amine compounds able to be added in the first configuration can be similarly added to the carbon dioxide absorber of the second configuration of the present invention. The following provides a detailed explanation of amine compounds that can be added.

Use of the following amine compounds with the aforementioned Compound A makes it possible to supplementarily enhance the functions of the carbon dioxide absorber in terms of absorption rate and absorbed amount. Although there are no particular limitations on these amine compounds provided they do not impair the reaction between Compound A and carbon dioxide, an amine compound having a high vapor pressure and low boiling point while also having low heat of reaction during reaction with carbon dioxide is more preferable. Examples of amine compounds able to be contained include primary amines such as monoethanolamine, 1-amino-2-propanol, 1-amino-2-butanol, 2-amino-1-propanol, 2-amino-1-butanol, 2-amino-2-methyl-1-propanol, 2-amino-1,3-propanediol, 3-amino-1-propanol, 3-amino-1,2-propanediol, aniline or cyclohexylamine, secondary amines such as 2-methylaminoethanol, 2-ethylaminoethanol, 2-isopropylaminoethanol, 2-propylaminoethanol, diethanolamine, diisopropanolamine, 2-t-butylaminoethanol, 2-n-butylaminoethanol or piperidine, tertiary amines such as 2-dimethylaminoethanol, 2-diethylaminoethanol, 1-dimethylamino-2-propanol, N-ethyl-N-methylethanolamine, N-methyldiethanolamine, N-ethyldiethanolamine, triethanolamine, N,N-dimethylaniline, pyridine or 1-hydroxyethylpiperidine, diamines such as 1,3-diaminopropan-2-ol, 1-amino-3-(2-hydroxyethylamino)propan-2-ol, 1,1,3-tris(2-hydroxyethylamino)propan-2-ol, 1,1,3,3-tetrakis(2-hydroxyethylamino)propan-2-ol, 1-amino-3-(2-hydroxypropylamino)propan-2-ol, 1,1,3-tris(2-hydroxypropylamino)propan-2-ol, 1,1,3,3-tetrakis(2-hydroxypropylamino)propan-2-ol, ethylenediamine, N,N'-bis(2-hydroxyethyl)-1,2-ethylenediamine, hexamethylenediamine or N,N'-bis(2-hydroxyethyl)-1,6-hexamethylenediamine, piperazines such as piperazine, 2-methylpiperazine, 2,5-dimethylpiperazine or 1-hydroxyethylpiperazine, diethylenetriamine, tetraethylenepentamine, polyethyleneimine, polyvinylamine and polyallylamine. There are preferable ratios for using these amine compounds in combination with Compound A of the present invention corresponding to reaction behavior and degree of affinity with carbon dioxide as well as the size of the molecular weight thereof. The following provides a detailed description thereof.

Among the aforementioned amine compounds, diethanolamine is able to efficiently utilize water molecules since it has a large number of hydroxyl groups per amino group, and as a result thereof, is able to react efficiently even under conditions of a small number of water molecules. Thus, in the case of combining the use of Compound A and diethanolamine, the functions of the carbon dioxide absorber can be adjusted while maintaining the interaction between Compound A and water.

Within the amine, the ratio of Compound A is preferably within the range of 30.0% by mass to 80.0% by mass, and the ratio of diethanolamine is preferably within the range of 20.0% by mass to 70.0% by mass. More preferably, the ratio of Compound A is within the range of 40.0% by mass to 70.0% by mass, and the ratio of diethanolamine is within the range of 30.0% by mass to 60.0% by mass. If within these ranges, the properties of Compound A are adequately demonstrated and the effects of combined use are also adequately demonstrated, thereby making this comparatively effective.

On the other hand, among the aforementioned amines, piperazine and 2-methylpiperazine, having a high amine value per molecule, make it possible to adjust the performance of the carbon dioxide absorber by only adding an extremely small amount thereof. Thus, these amines can be used without impairing the effects demonstrated by Compound A, and are preferable in terms of amines present in the carbon dioxide absorber that are used in combination with Compound A. In the case of combining the use of Compound A with piperazine and/or 2-methylpiperazine, the ratio of Compound A in the amine is preferably within the range of 85.0% by mass to 99.0% by mass and the ratio of piperazine and/or 2-methylpiperazine is preferably within the range of 1.0% by mass to 15.0% by mass. More preferably, the ratio of Compound A is within the range of 90.0% by mass to 98.5% by mass and the ratio of piperazine and/or 2-methylpiperazine is within the range of 1.5% by mass to 10.0% by mass.

In addition, the effects of the aforementioned diethanolamine and the effects of the aforementioned piperazine and 2-methylpiperazine can also be demonstrated simultaneously by using Compound A in the amine in combination with diethanolamine and piperazine and/or 2-methylpiperazine. In this case, the ratio of Compound A in the entire amine is preferably within the range of 30.0% by mass to 75.0% by mass, the ratio of diethanolamine is preferably within the range of 20.0% by mass to 65.0% by mass, and the ratio of piperazine and/or 2-methylpiperazine is preferably within the range of 1.0% by mass to 15.0% by mass.

* Other Components

A solvent other than water may also be contained as necessary as another component in the carbon dioxide absorber of the second configuration. The solvent contained is preferably the same as that explained for the first configuration.

In addition, other components can be contained in the same manner as explained for the first configuration for the purpose of adjusting the performance of the carbon dioxide absorber in terms of separating and recovering carbon dioxide.

<Carbon Dioxide Absorber Regeneration Method>

It is necessary to release absorbed carbon dioxide in order to use the carbon dioxide absorber repeatedly. As was previously described, one characteristic of the carbon dioxide absorber of the present invention is a reduction in the heat of reaction during absorption of carbon dioxide. This characteristic results in the effect of saving energy when regenerating the carbon dioxide absorber by releasing carbon dioxide by heating after having absorbed carbon dioxide. The heating temperature during regeneration is within the range of 80° C. to 130° C. and preferably within the range of 90° C. to 120° C. Although there are no particular limitations on the heating means, a method that is typically used consists of exchanging heat with a high-temperature medium in the manner of steam such as by using a reboiler. In addition, the effects of the carbon dioxide absorber of the present invention are similarly demonstrated even in the case of regenerating under high pressure conditions.

<Separation and Recovery Method>

The following provides an explanation of the method used to separate and recover carbon dioxide of the present invention. The carbon dioxide separation and recovery method of the present invention consists of efficiently and continuously separating and recovering carbon dioxide from a gas containing carbon dioxide in the manner of combustion exhaust gas. More specifically, a step for absorbing carbon dioxide by contacting a gas containing carbon dioxide with the carbon dioxide absorber, and a step for subsequently regenerating the carbon dioxide absorber by causing the carbon dioxide to be released by heating the carbon dioxide absorber are carried out. These steps are carried out repeatedly. Using the carbon dioxide absorber of the present invention makes it possible to reduce the amount of thermal energy for heating and decrease loss attributable to volatilization of the amine compound in the carbon dioxide absorber as well as corrosion of the material of the reactor. In particular, in the case of using the carbon dioxide absorber in the state of a solution, separation and recovery can be carried out using the same apparatuses and equipment used in conventional chemical absorption processes.

Moreover, when carrying out separation and recovery of carbon dioxide using the carbon dioxide absorber of the present invention, the temperature when releasing carbon dioxide by heating can be made to be lower than the conventionally used temperature of 110° C. to 130° C. Lowering the temperature during release of carbon dioxide makes it possible to reduce the burden on regeneration heaters, reduce the amount of energy required for raising the temperature, and separate and recover carbon dioxide while saving energy. In addition, unused waste heat from a heat exchanger or heat pump can also be used. However, since the temperature during release of carbon dioxide must be higher than the temperature during absorption, the temperature at which the carbon dioxide absorber is heated during release is preferably 60° C. or higher, preferably within the range of 60° C. to 100° C., and more preferably within the range of 65° C. to 95° C.

A carbon dioxide absorber used in a preferable embodiment of the present invention contains 1,3-bis(2-hydroxyethylamino)propan-2-ol at least within the range of 10% by mass to 60% by mass. This carbon dioxide absorber has properties of being able to lower the heat of reaction during absorption and release of carbon dioxide as well as simultaneously demonstrate superior release performance at comparatively low temperatures. In the apparatus of the present invention to be subsequently described, since the apparatus has two regeneration heaters in a regeneration tower, these properties are able to be demonstrated to a greater degree, enabling separation and recovery to be carried out with extremely high energy savings.

Low heat of reaction makes it possible to reduce the burden on regeneration heaters used to separate the amine compound and carbon dioxide, and as a result thereof, equipment costs required for regeneration heaters can be reduced.

Figure 3:
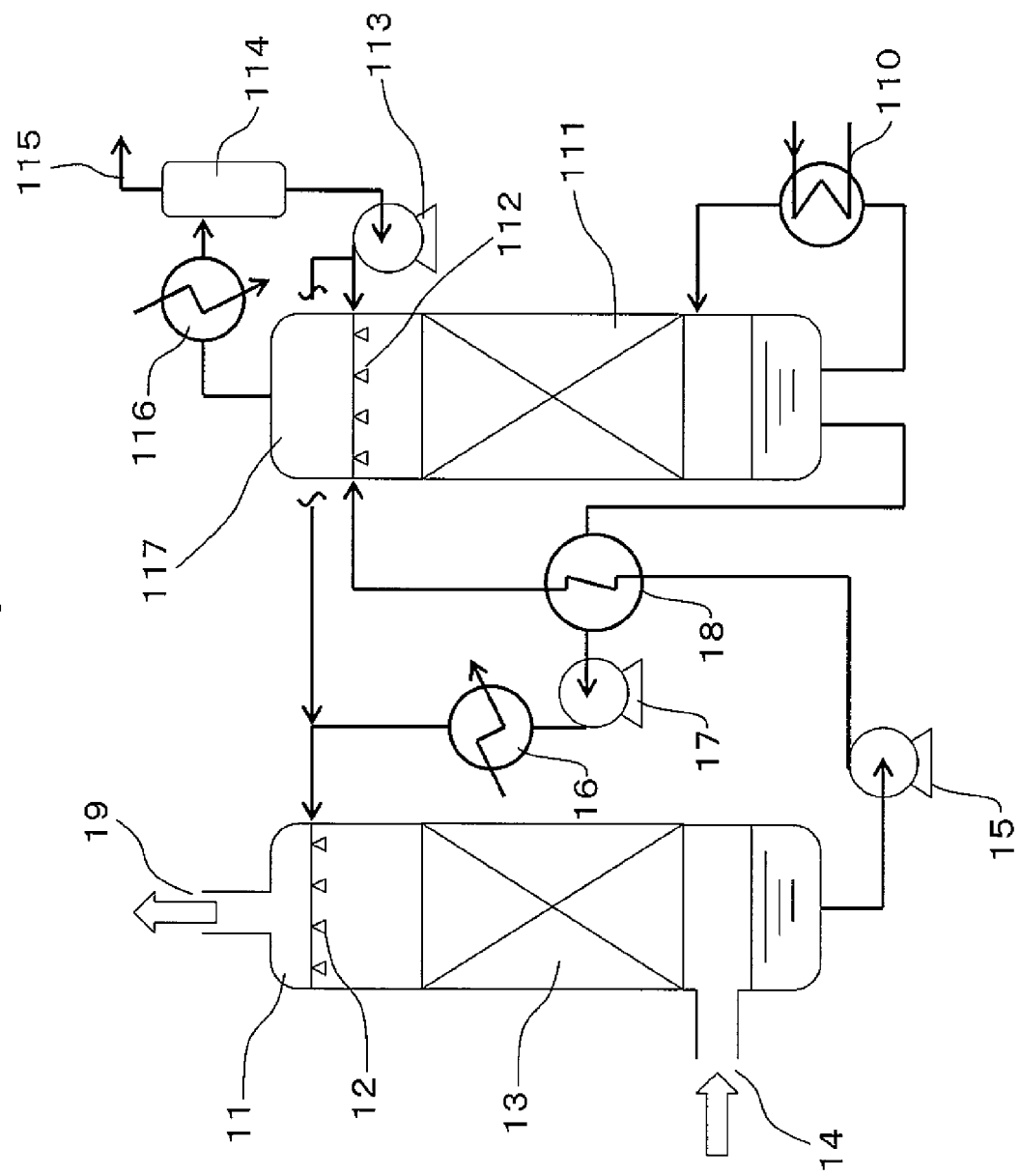
FIG. 3 is a schematic diagram of a carbon dioxide recovery apparatus in a chemical absorption process of the prior art.

An overview of a carbon dioxide separation and recovery apparatus used for a chemical absorption process is shown in FIG. 3. In FIG. 3, after a mixed gas containing carbon dioxide is humidified and cooled as necessary, it is supplied to an absorption tower 11 through a gas supply port 14. The mixed gas that has entered the absorption tower 11 makes convective contact with an absorber supplied from nozzles 12 in a lower packed portion 13 causing the carbon dioxide in the mixed gas to be absorbed and removed by the absorber. On the other hand, gas from which carbon dioxide has been removed is discharged from an upper exhaust port 19. In an absorber regeneration tower 117, the absorber is regenerated in a lower packed portion 111 by a regeneration heater 110. The regenerated absorber is then cooled by a heat exchanger 18 and a cooler 16 after which it is returned to the absorption tower. Carbon dioxide that has been separated from the absorber is cooled by a regeneration tower reflux condenser 116 and then enters a gas-liquid separator 114. Here, the carbon dioxide is discharged and recovered from a recovered carbon dioxide discharge line 115 after accompanying water vapor has been condensed and separated.

The aforementioned regeneration heater 110 typically employs a reboiler that boils the carbon dioxide absorber that has absorbed carbon dioxide by exchanging heat with steam at 130° to 150° C.

Figure 4:
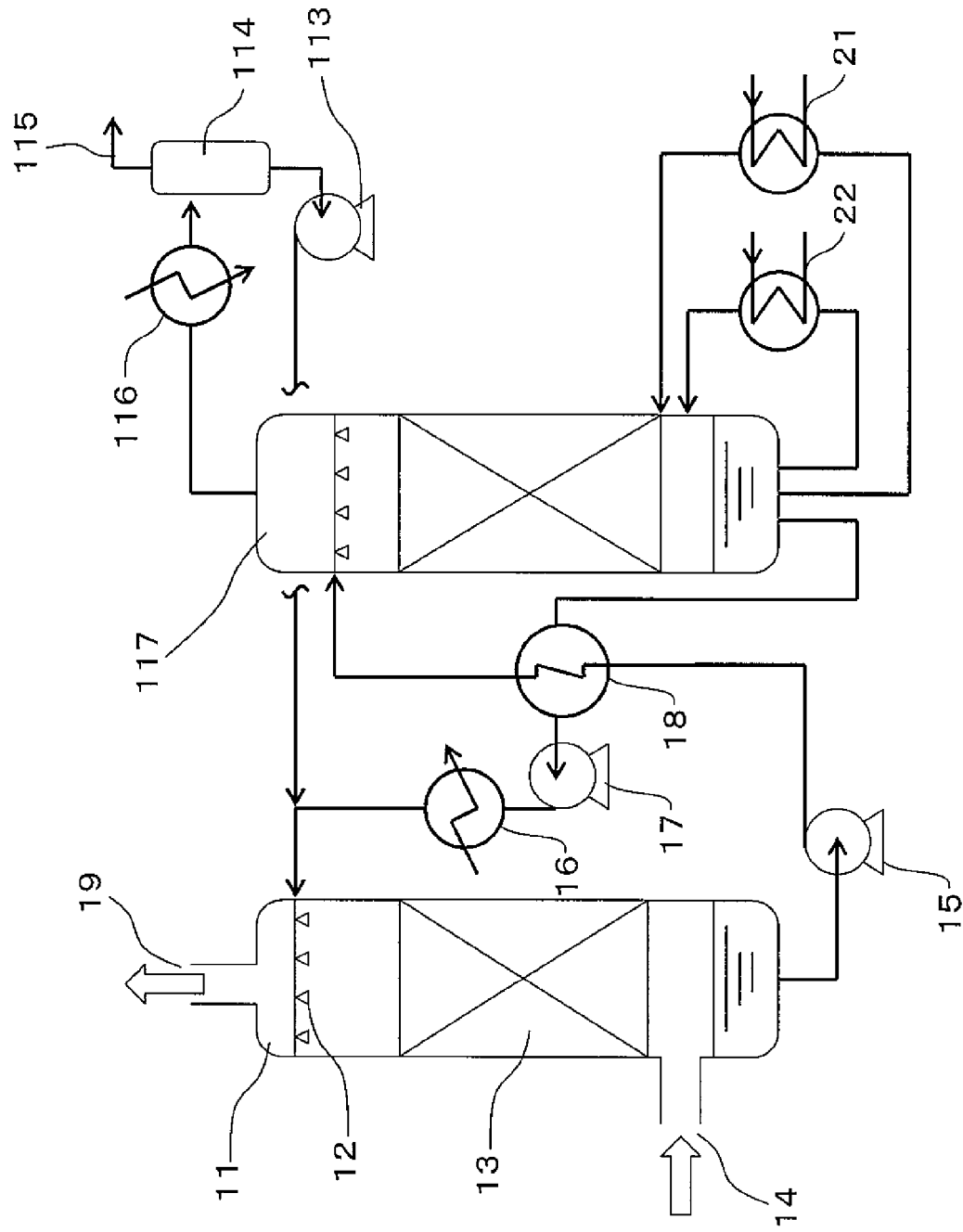
FIG. 4 is a schematic diagram of a carbon dioxide recovery apparatus of the present invention.

In the case of using a carbon dioxide absorber of the aforementioned second configuration, use of the apparatus described below enables separation and recovery with greater energy savings. An overview of the apparatus is shown in FIG. 4. This apparatus has two or more regeneration heaters in order to more effectively demonstrate the aforementioned properties of the carbon dioxide absorber. Namely, in this apparatus, the carbon dioxide absorber that is regenerated easily at low temperatures is regenerated over a comparatively low temperature range, thereby making it possible to reduce the amount of high-temperature heat source used. In the apparatus shown in FIG. 4, two regeneration heaters (21, 22) are arranged in the bottom of the regeneration tower. For example, a reboiler that uses ordinarily used steam as a heat source is used for the regeneration heater 22, while a reboiler that uses a low-temperature heat source is used for the other regeneration heater 21. In this configuration, the amount of thermal energy consumed by the regeneration heater 22 can be reduced by the amount of thermal energy consumed by the regeneration heater 21. Namely, in the case of using a steam-heated reboiler for the regeneration heater 22, the amount of steam can be reduced.

A heater such as a reboiler or a heat exchanger and the like that is suitable for regenerating a carbon dioxide absorber that has absorbed carbon dioxide can be used as a regeneration heater. For example, an apparatus can be used that has a mechanism that returns a heated carbon dioxide absorber and a generated steam component to a regeneration tower by exchanging heat between a heat source and the carbon dioxide absorber that has left the regeneration tower after having absorbed carbon dioxide.

Figure 5:
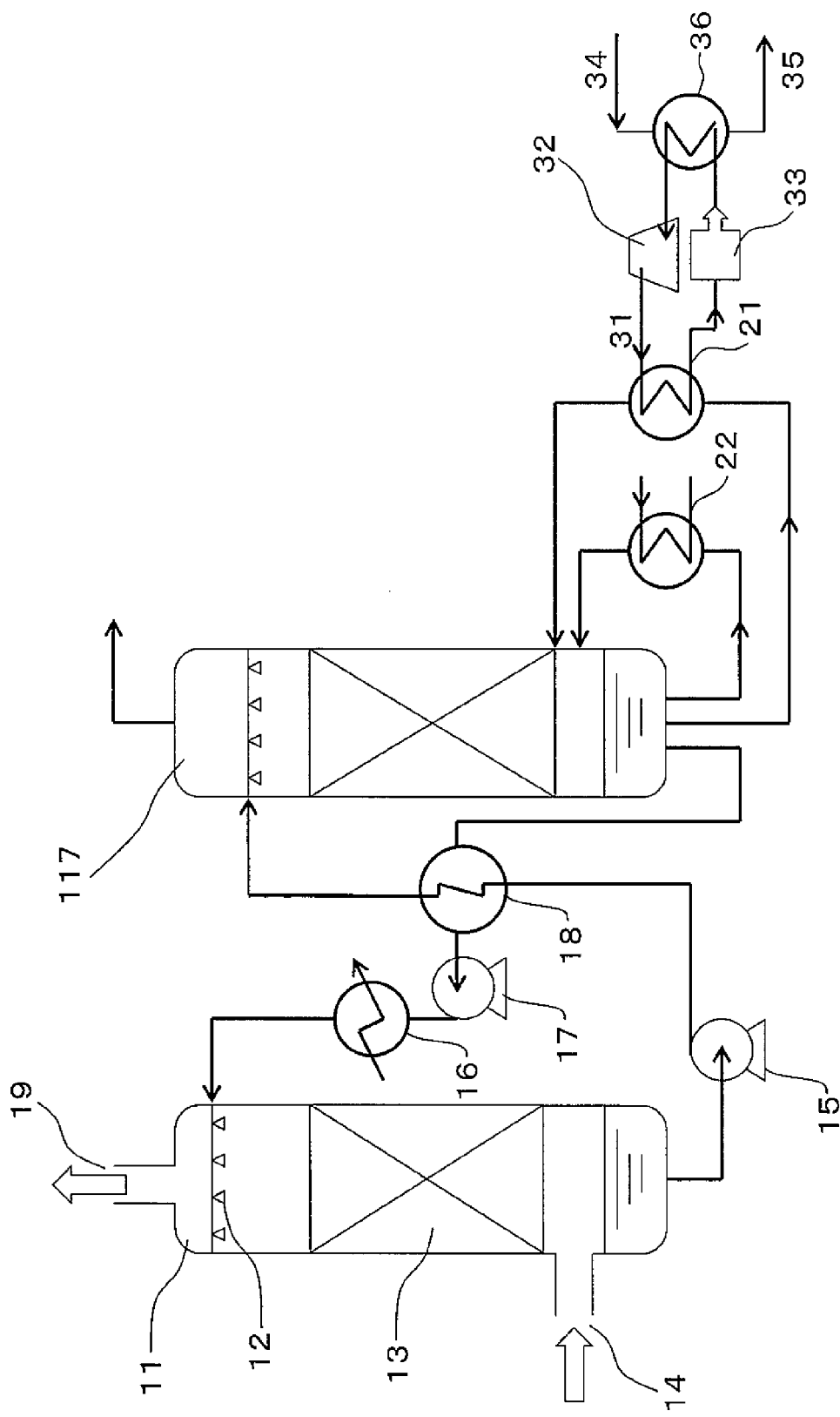
FIG. 5 is a schematic diagram of a carbon dioxide recovery apparatus that uses a heat pump.

An apparatus that uses a heat pump for the aforementioned regeneration heater 21 is shown in FIG. 5 as an example of a more preferable embodiment of a device that uses two regeneration heaters as described above. In this example, a high-pressure side, high-temperature coolant 31 of a heat pump is used as a heat source of the regeneration heater 21. After having undergone a reduction in pressure following heat exchange, the heat pump coolant recovers heat from a heat source 34 in a heat exchanger 35, after which it is compressed with a compressor 32 to become the high-pressure side, high-temperature coolant 31. The performance of the heat pump is dependent on the temperature difference between the heat source 34 and the heating temperature of the carbon dioxide absorber. Since the motive power of the compressor 32 increases as this pressure difference becomes larger, the efficiency of the heat pump decreases. For example, in the case of heating a carbon dioxide absorber that has absorbed carbon dioxide to 100° C., the temperature of the heat source 34 is preferably 40° C. or higher and more preferably 50° C. or higher. An aqueous medium is preferable for this type of heat source, and hot water at a temperature of 40° C. to 70° C. normally generated in an internal factory cooling process and the like can be used. For example, a large volume of seawater is used in the cooling process of a thermoelectric power plant, and this water is disposed of in the form of waste hot water at a temperature of about 50° C. The use of this waste hot water as a heat source makes it possible to significantly reduce the actual amount of energy consumed in terms of regenerating the carbon dioxide absorber used in the present invention.

Figure 6:
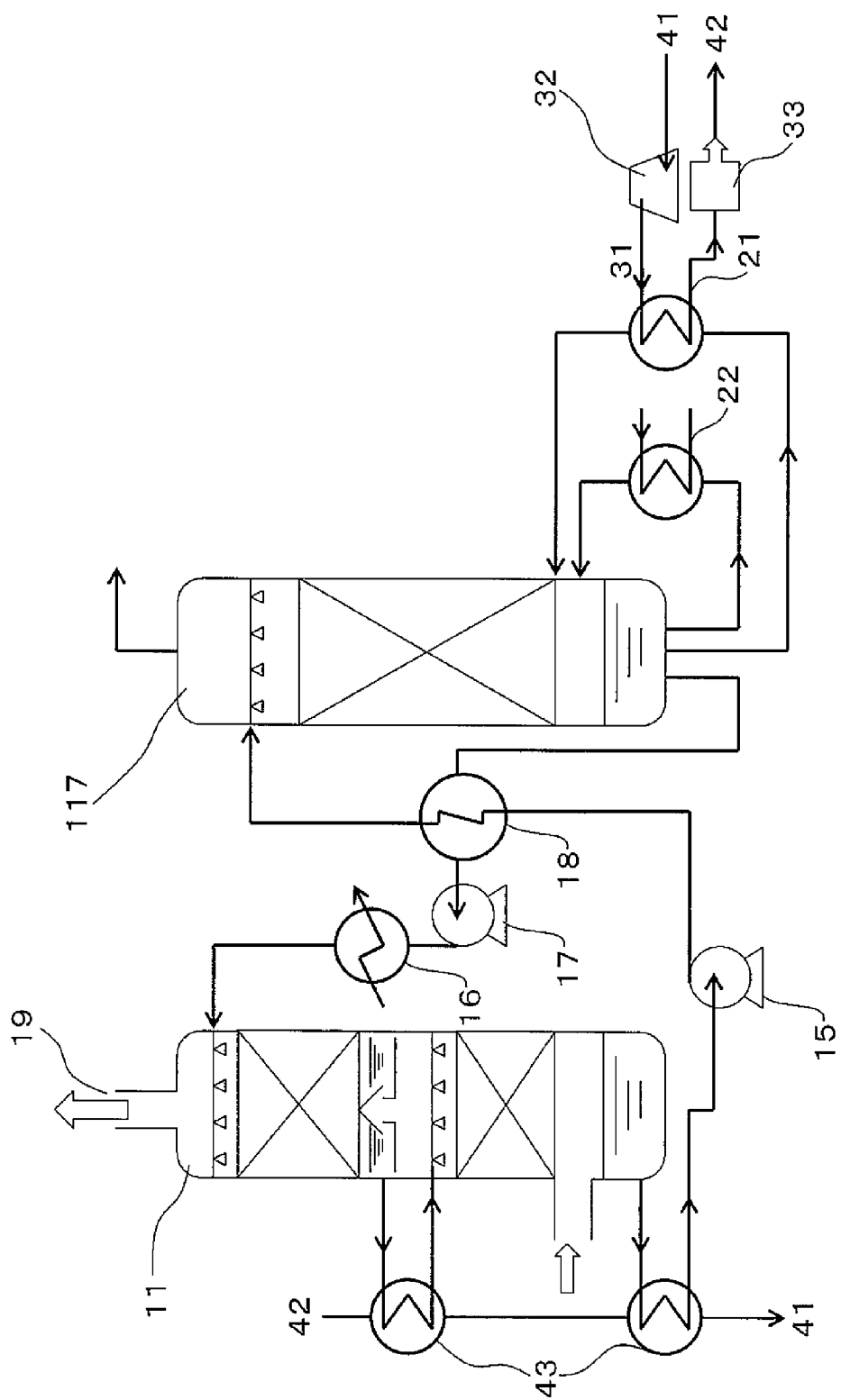
FIG. 6 is a schematic diagram of a carbon dioxide recovery apparatus that uses a carbon dioxide absorber for the heat source of a heat pump.

FIG. 6 shows an example of using a carbon dioxide absorber that generates heat by absorbing carbon dioxide in an absorption tower using the heat source of a heat pump. In the case of not using hot water and the like for the heat source of the heat pump, unused heat generated in such a system can also be recovered. Carbon dioxide absorber that has absorbed carbon dioxide in an absorption tower is heated by generation of heat during absorption. The temperature within the absorption tower is normally controlled to 30° C. to 50° C. For example, carbon dioxide absorber that has been introduced from the upper portion of the absorption tower at 40° C. generates heat accompanying absorption of carbon dioxide, and the temperature at the bottom of the absorption tower reaches 45° C. or higher. By cooling the carbon dioxide absorber that has absorbed carbon dioxide, the thermal energy corresponding to this generation of heat is recovered by a coolant and then used after converting to heat at, for example, 90° C. to 110° C. with a heat pump. In this FIG. 6, the carbon dioxide absorber that has absorbed carbon dioxide respectively escapes from the middle and bottom of the absorption tower, and is made to undergo heat exchange with a low-pressure side, low-temperature coolant 41 of the heat pump by a heat exchanger 43. After having recovered heat from the carbon dioxide absorber that has absorbed carbon dioxide, the coolant 41 is introduced into a compressor of the heat pump. The method for recovering heat from the carbon dioxide absorber that has absorbed carbon dioxide is not limited to the method shown in the drawings, and for example, heat exchange may be allowed to take place in the absorption tower by allowing the low-pressure side, low-temperature coolant of the heat pump to pass through the absorption tower.

Figure 7:
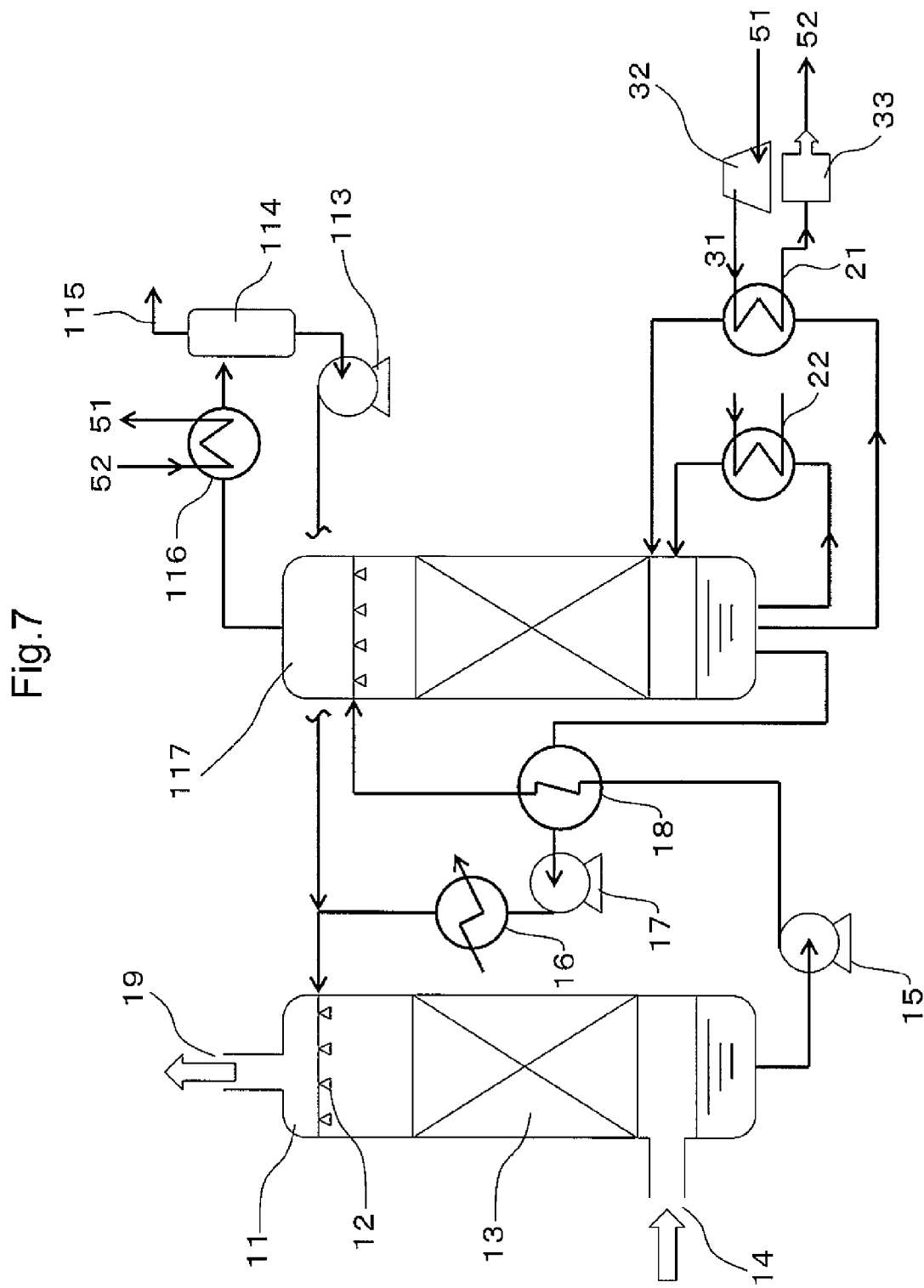
FIG. 7 is a schematic diagram of a carbon dioxide recovery apparatus that uses recovered carbon dioxide and water vapor components of a carbon dioxide absorber as heat sources of a heat pump.

FIG. 7 indicates an example of using gaseous carbon dioxide recovered from a carbon dioxide absorber that has absorbed carbon dioxide following heating treatment in a regeneration tower, and water vapor components of the carbon dioxide absorber, as heat sources of a heat pump. As was previously described, since water vapor components of the carbon dioxide absorber consisting mainly of water are contained in carbon dioxide obtained from a regeneration tower even in apparatuses used in ordinary chemical absorption processes, these components are cooled in the regeneration column reflux condenser 116, and water vapor components accompanying the carbon dioxide are condensed and separated in the gas-liquid separator 114. In this example, heat is recovered by using a low-pressure side, low-temperature coolant 52 of the heat pump as coolant used in the regeneration tower reflux condenser 116. In addition, water may be used as coolant in the regeneration tower reflux condenser 116, and heat may be recovered by causing heat exchange between that coolant and the coolant of the heat pump. In addition, a compressor may be further provided prior to cooling, and cooling may be carried out by coolant after having adiabatically compressed the carbon dioxide and the water vapor components of the carbon dioxide absorber and further raised the temperature thereof.

Figure 8:
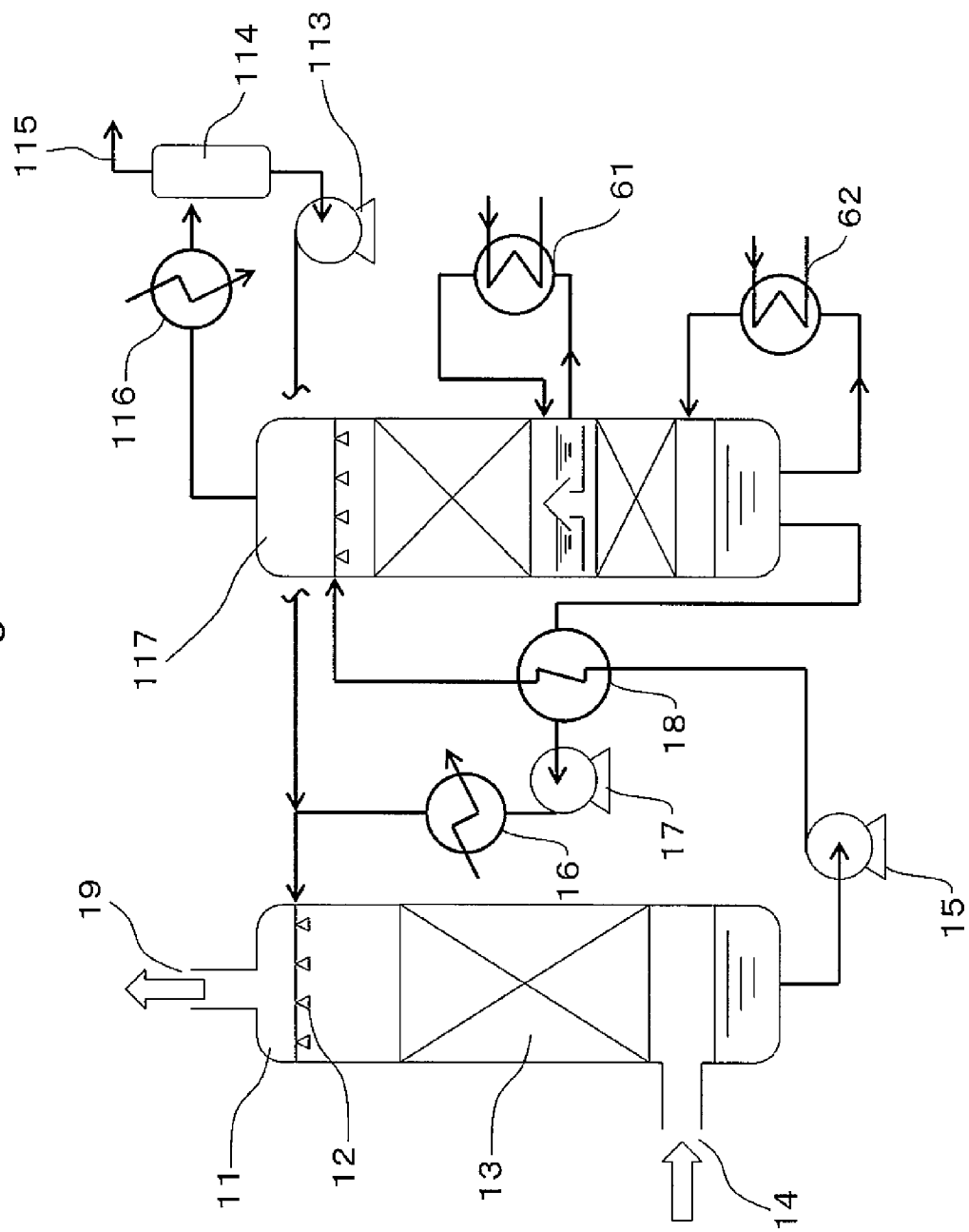
FIG. 8 is a schematic diagram showing an example of the arrangement of two regeneration heaters in the case of different heat source temperatures.

In the case there is a considerable difference in heating capacity between two regeneration heaters, the locations where the two regeneration heaters are arranged may be changed. In the apparatus shown in FIG. 8, two regeneration heaters (61, 62) are arranged at an intermediate location and in the bottom of a regeneration tower. In this configuration, regeneration can be carried out at a low temperature using a heat pump with the regeneration heater 61 located upstream from the location where carbon dioxide absorber that has absorbed carbon dioxide is introduced from the absorption tower, while regeneration at a high temperature using steam can be carried out with the regeneration heater 62 located on the downstream side from the location where the carbon dioxide absorber that has absorbed carbon dioxide is sent to the absorption tower. In this configuration as well, the amount of thermal energy consumed by the regeneration heater 62 can be reduced by the amount of thermal energy consumed by the regeneration heater 61. Namely, after having regenerated the carbon dioxide absorber that is easily regenerated at low temperatures over a low temperature range, the remaining carbon dioxide absorber that has not been regenerated is regenerated using a high-temperature heat source. Although preferable temperature conditions in terms of operating in such a configuration vary according to the carbon dioxide absorber used, temperature conditions for the upstream side regeneration heater 61 are preferably within a range of 70° C. to 100° C. and more preferably within a range of 80° C. to 95° C. Temperature conditions for the downstream side regeneration heater 62 are preferably within a range of 100° C. to 120° C. and more preferably within a range of 100° C. to 110° C. The optimum location where the regeneration heater 61 is arranged is determined according to the temperature conditions of the two regeneration heaters.

There are no particular limitations on the gas that contains carbon dioxide, and gases having various compositions, concentrations, pressures and temperature conditions can be applied. Examples of gas components other than carbon dioxide include nitrogen, oxygen, hydrogen, methane, ethane, propane, butane, argon and water vapor. Specific examples of gases that require separation while saving energy in particular include thermoelectric power plant flue gas, steelworks flue gas, cement plant flue gas, chemical plant flue gas, biofermentation gas and natural gas. Among these gases, the separation and recovery apparatus of the present invention is preferably used for gases containing acidic gases other than carbon dioxide as components thereof by combining with a known desulfurization or denitrification process and the like.

<Combustion Exhaust Gas Treatment System>

The combustion exhaust gas treatment system of the present invention continuously separates and recovers carbon dioxide in combustion exhaust gas using the previously described carbon dioxide recovery apparatus. Since acidic gases other than carbon dioxide are typically contained in combustion exhaust gas as components thereof, a known desulfurization and/or denitrification apparatus is preferably installed upstream from the carbon dioxide recovery apparatus. In addition, a dust collector for capturing particulate matter is more preferably installed further upstream therefrom. In cases in which components of a carbon dioxide absorber are contained as water vapor in treated exhaust gas from which carbon dioxide has been removed by the aforementioned carbon dioxide recovery apparatus, a mechanism for condensing the water vapor components by cooling or a mechanism for washing off with rinsing water may be further provided. This type of combustion exhaust gas treatment system removes a significant amount of carbon dioxide and allows treated exhaust gas that has been removed of NOx, SOx and other harmful substances to be released into the atmosphere.

In addition to the recovered carbon dioxide having high purity and being able to be used for liquefaction or as dry ice, it can also be used for isolation using underground storage technologies as well as in technologies for increasing petroleum production by injecting into oil fields.

EXAMPLES

The following provides a more detailed explanation of the present invention through examples thereof.

Furthermore, the present invention is not limited by the following examples.

<Explanation of Abbreviations>
MEA: Monoethanolamine
DEA: Diethanolamine
Pz: piperazine
MDEA: Methyldiethanolamine
BHEP: 1,3-bis(2-hydroxyethylamino)propan-2-ol
BHPP: 1,3-bis(2-hydroxypropylamino)propan-2-ol
HEHPP: 1-(2-hydroxyethylamino)-3-(2-hydroxypropylamino)
propan-2-ol
DAP: 1,3-diaminopropan-2-ol
THPP: 1,3-tetrakis(2-hydroxypropylamino)propan-2-ol
EAE: 2-ethylaminoethanol 2A13PD: 2-amino-1,3-propanediol
IPAE: 2-isopropylaminoethanol
TMB: Trimethylborate
TEB: Triethylborate Carbon Dioxide Absorber of First Configuration Examples 1 to 4

In order to evaluate the first configuration of the present invention, an amine compound, a weakly acidic compound and water were mixed and dissolved in the ratios shown in Table 1 to obtain carbon dioxide absorbers. The pKb values of the amine compounds, the pKa values of the weakly acidic compounds, and the number of equivalents of the weakly acidic compounds with respect to amino groups are shown in Table 1. The pKb values of the amine compounds and the pKa values of the weakly acidic compounds were respectively calculated from the pH value in a 0.4 M aqueous solution.

TABLE 1

| | Amine compound | pKb | Wt % | Weakly acidic compound | pKa | Wt % | Eq/no. of amino groups | Water content (wt %) |
|---|---|---|---|---|---|---|---|---|
| Ex. 1 | MEA | 4.7 | 28.3 | Boric acid | 9.2 | 5.7 | 0.2 | 66.0 |
| Ex. 2 | MEA | 4.7 | 23.0 | Boric acid | 9.2 | 23.3 | 1.0 | 53.7 |
| Ex. 3 | DEA | 5.4 | 47.2 | Boric acid | 9.2 | 5.6 | 0.2 | 47.2 |
| Ex. 4 | DEA | 5.4 | 45.6 | Boric acid | 9.2 | 2.3 | 0.07*[1] | 48.9 |
| | Pz | 4.8 | 3.2 | | | | | |
| Ex. 5 | Pz | 4.8 | 21.2 | Boric acid | 9.2 | 15.2 | 0.5 | 63.6 |
| Comp. Ex. 1 | MEA | 4.7 | 28.3 | Acetic acid | 4.8 | 5.6 | 0.2 | 66.1 |
| Comp. Ex. 2 | MEA | 4.7 | 30.0 | None | — | — | — | 70.0 |
| Comp. Ex. 3 | DEA | 5.4 | 50.0 | None | — | — | — | 50.0 |
| Comp. Ex. 4 | DEA | 5.4 | 46.7 | None | — | — | — | 50.0 |
| | Pz | 4.8 | 3.3 | | | | | |
| Comp. Ex. 5 | MDEA | 5.7 | 45.0 | None | — | — | — | 55.0 |
| Comp. Ex. 6 | Pz | 4.8 | 21.2 | None | — | — | — | 78.8 |

*[1]1.0 equivalent when converted based on 1 mole of piperazine

* Evaluation of Reactivity with Carbon Dioxide

Reactivity with carbon dioxide was evaluated using the method indicated below for the carbon dioxide absorbers of Examples 1 and 2 and Comparative Examples 1 and 2.

The amount of carbon dioxide absorbed was evaluated by blowing carbon dioxide gas into 25 mL aliquots of each carbon dioxide absorber for 15 minutes at 300 mL/min. The temperature of the absorbers was 30° C. The absorbed amount was calculated from the element ratios of C and N as determined by measuring the absorber before and after reaction with the Model TOC-VCP and Model TNM-1 Total Organic Carbon Analyzers (Shimadzu Corp.). In addition, the ratios of carbamates and bicarbonates in the absorbed carbon dioxide were calculated by measuring the liquid after absorption by $^{13}$C-NMR followed by determination of their respective absorbed amounts. Moreover, the liquid after absorption was stirred for 15 minutes while heating to 90° C. to release the carbon dioxide and regenerate the absorber. The absorbed amount of carbon dioxide remaining after regeneration was also calculated from the element ratios of C and N, and the reduction in the amount of absorbed carbon dioxide was taken to be amount of carbon dioxide released. The pH, amount of carbon dioxide absorbed at 30° C., amount of carbamates, amount of bicarbonates and amount of carbon dioxide released at 90° C. are shown for each absorber in Table 2.

$^{13}$C-NMR analyses were carried out in the manner indicated below. Measurements were carried out at a frequency of 150 MHz using the Avance 600 MHz Fourier Transform Nuclear Magnetic Resonance Spectrometer (Bruker Biospin Corp.). Deuterated chloroform was inserted in a duplex tube and used as an internal standard. Peaks corresponding to carbamic acid and carbamates were observed at 164 ppm to 165 ppm, while peaks corresponding to bicarbonates and carbonates were observed at 161 ppm to 162 ppm. Since the amounts of carbamic acid and carbonates present were extremely low, the integral ratios of these two peaks were taken to be the abundance ratios of carbamates and bicarbonates.

Measurement of pH was carried out in the manner indicated below. The Model HM-31P Portable pH Meter (DKK-Toa Co., Ltd.) was used after installing the GST-2729C pH composite electrode. Before measuring each sample, the pH meter was calibrated with a pH 6.86 standard solution, pH 4.01 standard solution and pH 9.18 standard solution. Measurements were carried out by placing 30 mL of sample in a 50 mL beaker while warming with a water bath, and pH was recorded when the sample temperature reached 30.0° C. Furthermore, the aforementioned pKa values of the amine compounds and pKa values of the weakly acidic compounds were calculated from pH values measured in the same manner.

According to Table 2, when the pH values of the absorbers of Examples 1 and 2 were compared with that of Comparative Example 2, they were found to be much lower. Although the absorbed amount of carbon dioxide tends to decrease corresponding to boric acid content, the amounts of carbon dioxide released at 90° C. were equivalent or better. On the basis thereof, properties as a carbon dioxide absorber were determined to be adequate even in the state of forming a salt with boric acid. In addition, when compared with Comparative Example 2, although the amounts of carbonate in the absorbers of Examples 1 and 2 decreased corresponding to the content of boric acid, the amounts of bicarbonate conversely increased. On the basis of this finding, the heat of the reaction with carbon dioxide is presumed to have decreased. On the other hand, in Comparative Example 1, in which acetic acid was used for the weakly acidic compound, although a decrease in pH and a decrease in the amount of carbamate were confirmed in the same manner as in the examples, the amount of bicarbonate also decreased, and as a result thereof, the amount of carbon dioxide released also decreased accompanying a decrease in the amount absorbed. On the basis thereof, neutralization of acetic acid and monoethanolamine was determined to not initiate an exchange reaction with carbon dioxide and only impair absorber performance.

TABLE 2

|  | Absorber pH | Absorbed amount (moles $CO_2$/ moles N) | Amount of carbamate (moles $CO_2$/ moles N) | Amount of bicarbonate (moles $CO_2$/ moles N) | Released amount (moles $CO_2$/ moles N) |
|---|---|---|---|---|---|
| Example 1 | 10.9 | 0.45 | 0.23 | 0.22 | 0.27 |
| Example 2 | 10.3 | 0.36 | 0.14 | 0.22 | 0.24 |
| Comp. Ex. 1 | 10.5 | 0.34 | 0.20 | 0.14 | 0.18 |
| Comp. Ex. 2 | 12.3 | 0.57 | 0.41 | 0.16 | 0.23 |

\* Evaluation of Absorbed and Released Amounts of Carbon Dioxide

The absorbed and released amounts of carbon dioxide were evaluated according to the method indicated below using the carbon dioxide absorbers of Examples 3 and 4 and Comparative Examples 3 to 5.

Figure 9A:
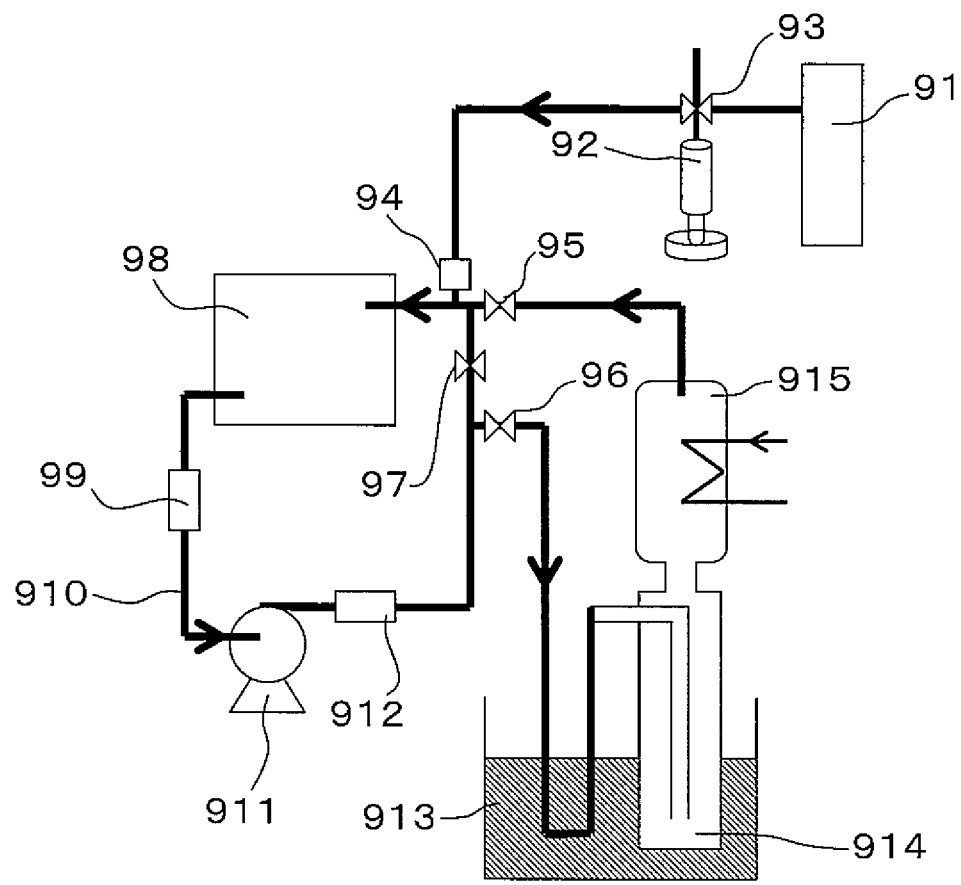
FIG. 9A is a schematic diagram of an apparatus for evaluating absorbed and released amounts of carbon dioxide.

The apparatus shown in FIG. 9A was fabricated. This apparatus allows a gas containing carbon dioxide to pass through a gas scrubbing bottle containing absorber while being circulated through a closed system by a pump. As a result, this device allows carbon dioxide to be absorbed and then measures the absorbed amount from the concentration of carbon dioxide in the gas. The evaluation method consists of first circulating gas at a flow rate of 1.5 L/min with a pump 911 with valves 95 and 96 closed and valve 97 open. 500 mL of carbon dioxide are charged into a gas syringe with a carbon dioxide cylinder 91, and the concentration of the circulating gas is adjusted by adding air so that the concentration of carbon dioxide becomes 17% by volume. 6 g of carbon dioxide absorber are placed in a gas scrubbing bottle 914 followed by warming with an oil bath 913 so that the internal temperature thereof reaches a specified temperature. Next, valves 95 and 96 are opened and valve 97 is closed to allow the carbon dioxide-containing gas to circulate through the gas scrubbing bottle 914, and the amount of carbon dioxide absorbed by the absorber is monitored with a carbon dioxide concentration meter 99. After evaluating absorption performance in this manner, the temperature of the oil bath is raised and the absorbed amount is measured in the same manner to evaluate the reduction in the absorbed amount as the amount of carbon dioxide released. The amount of carbon dioxide absorbed is calculated from the carbon dioxide concentration and the amount of air of 2.85 L measured based on the initial interval volume of the apparatus. The initial interval volume of the apparatus was calculated from the concentration of carbon dioxide by carrying out the same procedure with the exception of not adding absorber. Furthermore, the environment in the room in which the apparatus was installed was at normal pressure and normal temperature.

\* Evaluation of Heat of Reaction

Heat of reaction of the carbon dioxide absorbers was evaluated under the following conditions using the Model RC-1 Reaction calorimeter (Mettler-Toledo International Inc.).

Reaction vessel: Normal pressure, glass container AP00 (internal volume: 80 mL)
Stirrer: Turbine type
Stirring speed: 300 rpm
Gas injection port: Glass ball filter (G1)

50 g of carbon dioxide absorber were placed in the reaction vessel of the calorimeter and the temperature in the reaction vessel was set to 27° C. followed by calibration and measurement of specific heat. Following completion of calibration and measurement, the temperature inside the reaction vessel was set to 30° C. Subsequently, carbon dioxide was allowed to flow through the vessel at 50 mL/min, and time-based changes in the amount of heat generated at that time were measured. When generation of heat caused by the flow of gas had ended and the gas flow rate at the outlet reached a constant value, the flow of gas was discontinued. Following completion of the exothermic reaction, calibration and measurement were carried out and used as a baseline in combination with the calibration data prior to measurement. The amount of heat generated during the reaction was determined by integrating the resulting data of the time-based changes in the amount of heat generated. In addition, water in the gas discharged from the reaction vessel outlet was captured by passing through a U-shaped tube packed with silica gel, the captured amount was determined, and this was used as heat of reaction data by correcting for the heat of evaporation of water that evaporated as a result of allowing gas to flow through the reaction vessel.

The Model M-100SCCM-D (Alicat Scientific Inc.) calorimeter was used for measurement, and was respectively attached in front of the reaction vessel and after the U-shaped tube packed with silica gel.

The reacted amount was calculated from element ratios of C and N as measured with the Model TOC-VCP and Model TNM-1 Total Organic Carbon Analyzers (Shimadzu Corp.), and the aforementioned heat of reaction data was converted on the basis of the heat of reaction kJ/moles $CO_2$ per mole of carbon dioxide that reacted.

\* Evaluation Results

The absorbed amount, released amount and average heat of reaction of each absorber are shown in Table 3. Furthermore, absorption was carried out for 30 minutes at 30° C. in Examples 3 and 4 and Comparative Examples 3 and 4, and for 60 minutes at 30° C. in Comparative Example 5. In addition, the ratio of (absorbed amount 15 minutes after start of absorption)/(absorbed amount after 30 minutes) is also shown in Table 3 as an indicator of absorption rate. Release of carbon dioxide was carried out for 20 minutes after heating to 90° C. in all cases.

TABLE 3

|  | Absorber pH | Absorbed amount (moles $CO_2$/ moles N) | 15 min absorbed amt/30 min absorbed amt | Released amount (moles $CO_2$/ moles N) | Heat of reaction (moles $CO_2$/ moles N) |
|---|---|---|---|---|---|
| Example 3 | 10.6 | 0.47 | 0.84 | 0.32 | 53.2 |
| Example 4 | 10.9 | 0.47 | 0.92 | 0.33 | 69.0 |
| Comp. Ex. 3 | 11.8 | 0.49 | 0.88 | 0.36 | 74.1 |
| Comp. Ex. 4 | 11.9 | 0.48 | 0.93 | 0.34 | 74.4 |
| Comp. Ex. 5 | 11.5 | 0.28 | 0.55 | 0.25 | 55.8 |

As shown in Table 3, when a comparison is made between Example 3 and Comparative Example 3, containing of boric acid caused a decrease in pH of the absorber, and the heat of reaction decreased considerably accompanying the exchange reaction and an increase in the amount of bicarbonate. The low heat of reaction of the absorber of Example 3 was also lower in comparison with that of Comparative Example 5 that used a tertiary amine, thereby indicating that the absorber of the present invention enables separation and recovery of carbon dioxide with extremely high energy savings. Although the absorption and release performance of the absorbers of Examples 3 and 4 decreased slightly as a result of containing boric acid, performance was overwhelmingly higher in comparison with Comparative Example 5, and was of a performance level enabling adequate use even in the case of separation and recovery of carbon dioxide from a gas at normal pressure. When Example 4 was compared with Comparative Examples 3 and 4, absorption rate was confirmed to improve by adding a small amount of piperazine. At the same time, the heat of reaction decreased in Example 4 and an extremely superior absorber was able to be obtained by containing a small amount of piperazine and an amount of boric acid corresponding thereto.

With respect to the examples, when the absorber of Example 5 was held at a temperature of 30° C., all of the piperazine was confirmed to dissolve. When pH was measured at 30° C., it was able to be confirmed to be low at 10.4. When this absorber was evaluated in the same manner as Example 1, it was confirmed to be able to be used as a carbon dioxide absorber. On the other hand, even if the absorber of Comparative Example 6 was held at 30° C., the piperazine remained undissolved and use as a carbon dioxide absorber in a solution state was difficult. When this absorber was dissolved at a high temperature to create a supersaturated state at 30° C. followed by measurement of pH, the pH was confirmed to be high at 12.3.

Carbon Dioxide Absorbers of First Configuration

Examples 6 to 12

In order to evaluate the first configuration of the present invention, an amine compound, a weakly acidic compound and water were mixed and dissolved in the ratios shown in Table 4 to obtain carbon dioxide absorbers. The results of testing these absorbers in the same manner as the absorbers of Examples 3 and 4 and Comparative Examples 3 to 5 are shown in Table 5.

TABLE 4

| | Amine compound | pKb | Wt % | Weakly acidic compound | pKa | Wt % | Eq/no. of amino groups | Water content (wt %) |
|---|---|---|---|---|---|---|---|---|
| Ex. 6 | EAE | 4.4 | 44.0 | Boric acid | 9.2 | 3 | 0.1 | 53.0 |
| Ex. 7 | 2A13PD | 5.6 | 45.0 | Boric acid | 9.2 | 3 | 0.1 | 52.0 |
| Ex. 8 | IPAE | 4.1 | 50.0 | Boric acid | 9.2 | 3 | 0.1 | 47.0 |
| Ex. 9 | IPAE | 4.1 | 45.5 | Boric acid | 9.2 | 3.5 | 0.1*2 | 46.5 |
| | Pz | 4.8 | 46.6 | | | | | |
| Ex. 10 | MDEA | 5.7 | 46.6 | Boric acid | 9.2 | 2.5 | 0.08*3 | 47.5 |
| | Pz | 4.8 | 3.4 | | | | | |
| Ex. 11 | DEA | 5.4 | 50.0 | TMB | 8.7 | 4.8 | 0.09 | 45.2 |
| Ex. 12 | DEA | 5.4 | 50.0 | TEB | 8.1 | 6.8 | 0.09 | 43.2 |
| Comp. Ex. 7 | EAE | 4.4 | 44.0 | None | — | — | — | 56.0 |
| Comp. Ex. 8 | 2A13PD | 5.6 | 45.0 | None | — | — | — | 55.0 |
| Comp. Ex. 9 | IPAE | 4.1 | 50.0 | None | — | — | — | 50.0 |
| Comp. Ex. 10 | IPAE | 4.1 | 45.5 | None | — | — | — | 50.0 |
| | Pz | 4.8 | 4.5 | | | | | |
| Comp. Ex. 11 | MDEA | 5.7 | 46.6 | None | — | — | — | 50.0 |
| | Pz | 4.8 | 3.4 | | | | | |

*2 0.9 equivalents when converted based on 1 mole of piperazine
*3 1.0 equivalent when converted based on 1 mole of piperazine

TABLE 5

| | Absorber pH | Absorbed amount (moles $CO_2$/ moles N) | 15 min absorbed amt/30 min absorbed amt | Released amount (moles $CO_2$/ moles N) | Heat of reaction (moles $CO_2$/ moles N) |
|---|---|---|---|---|---|
| Example 6 | 12.1 | 0.52 | 0.95 | 0.34 | 72.2 |
| Example 7 | 11.1 | 0.46 | 0.88 | 0.32 | 74.9 |
| Example 8 | 11.8 | 0.52 | 0.87 | 0.47 | 75.2 |
| Example 9 | 11.8 | 0.56 | 0.92 | 0.46 | 67.0 |
| Example 10 | 11.4 | 0.33 | 0.90 | 0.30 | 56.1 |
| Example 11 | 10.9 | 0.47 | 0.84 | 0.32 | 67.1 |
| Example 12 | 10.8 | 0.46 | 0.84 | 0.31 | 64.8 |
| Comp. Ex. 7 | 12.6 | 0.53 | 0.94 | 0.34 | 79.0 |
| Comp. Ex. 8 | 11.5 | 0.49 | 0.90 | 0.35 | 82.1 |
| Comp. Ex. 9 | 12.8 | 0.53 | 0.88 | 0.47 | 82.3 |
| Comp. Ex. 10 | 12.8 | 0.57 | 0.90 | 0.46 | 74.9 |
| Comp. Ex. 11 | 12.1 | 0.33 | 0.92 | 0.29 | 63.4 |

As shown in Table 5, when Examples 6 to 10 were compared with Comparative Examples 7 to 11, the heat of reaction of the absorber of the present invention was able to be confirmed to be lower in all cases. On the basis thereof, the effect of the weakly acidic compound was determined to be demonstrated irrespective of the type of amine compound. In Examples 11 and 12, although TMB having a pKa value of 8.7 and TEB having a pKa value of 8.1 were used as weakly acidic compounds, in comparison with the results for Comparative Example 3 (74.1 kJ/moles $CO_2$), the heat of reaction (67.1 kJ/moles $CO_2$ and 64.8 kJ/moles $CO_2$, respectively) was able to be confirmed to have decreased.

Carbon Dioxide Absorbers of First Configuration

Examples 13 to 15

Evaluation of Oxidative Degradation of Carbon Dioxide Absorbers

In order to evaluate the first configuration of the present invention, an amine compound, boric acid and water were mixed and dissolved in the ratios shown in Table 6 to prepare carbon dioxide absorbers, and a test was conducted on the oxidative degradation of the amine compound. Evaluation of oxidative degradation of the amine compound was carried out by measuring the amount of oxalic acid formed by oxidative degradation of an amine compound having a hydroxyethyl group.

The apparatus shown in FIG. 9B was fabricated. This apparatus is an apparatus for causing degradation of an absorber by supplying air containing 21% by volume of oxygen with a diaphragm pump 918 and causing convective contact with the absorber in a packing material 927. The operating conditions of the apparatus are indicated below.

Gas flow rate: 3.0 l/min
Liquid in gas scrubbing bottle 919: Water, volume: 150.0 mL, temperature: 25° C.
Absorber 920: Amount: 50.0 g, temperature: 110° C.
Oil bath 922 conditions: Temperature: 118° C.
Liquid circulating pump feed rate: 1.6 mL/min
Liquid inside jacket of jacketed glass tube 924: Water, temperature: 70° C.
Packing material 927: Dickson Packing SUS-316 (TOTOKU Engineering Co., Ltd.) (packing size: (φ3×3H)
Packing material 927 packed volume: φ18×200H
Condenser 928 conditions: Temperature: 25° C.

In this apparatus, liquid circulation pump 923 was operated after each portion of the apparatus had reached the prescribed temperature, and absorber was circulated at a rate of 1.6 mL/min. Subsequently, air was allowed to flow into the apparatus at 3.0 l/min using a flow rate regulating valve 916 and air supply pump 918. The air and absorber were allowed to make contact in the packing material 927 for 20 hours and the liquid following oxidative degradation was obtained.

Evaluation of oxidative degradation of the absorber was carried out by measuring the amount of oxalic acid in a liquid obtained by diluting the absorber 10-fold following the aforementioned oxidative degradation with the Model IC2001 Ion Chromatography System (Tosoh Corp.). The measurement conditions used during ion chromatography during this measurement are indicated below.

Column type: TSK-Gel Super IC-AP (4.6 mm, I.D.×15 cm)
Eluent: 1.7 mM $HCO_3$+1.8 mM $Na_2CO_3$
Flow rate: 0.8 mL/min
Injection volume: 30 μL
Pressure: 4.4 MPa
Calibration curve: Oxalic acid used Oxidation degradation of the absorber was evaluated in terms of the amount (μg) of oxalic obtained as a result thereof. Furthermore, oxalic acid was not observed in any of the absorbers prior to the degradation test.

\* Absorber Oxidative Degradation Evaluation Results

According to Table 6, the amount of oxalic acid formed by the absorbers of Examples 13 to 15 containing boric acid was confirmed to be lower in comparison with that of the absorbers of Comparative Examples 12 to 14 not containing boric acid. In particular, when Example 13, which uses a secondary amine in the form of EAE, was compared with the absorber of Comparative Example 12, the 437 μg of oxalic acid in Comparative Example 12 had decreased to a level at which it was no longer observed.

Carbon Dioxide Absorbers of Second Configuration

Examples 16 to 18

Next, amine compounds used in the second configuration of the present invention (Compound A) were prepared in the manner indicated below.

\* Production Examples of Amine Compounds Used in Examples (Compound A)

[Production Example of BHEP]

A mixed liquid of 20.0 g of monoethanolamine and 30.0 mL of ethanol was charged into a reaction vessel equipped with a stirrer, condenser and thermometer followed by raising the temperature to 30° C. with an oil bath. Next, a mixed liquid of 12.6 g of epichlorohydrin and 5.0 mL of ethanol was dropped into the aforementioned monoethanolamine solution over the course of 5 minutes while stirring, and allowed to react for 20 minutes following completion of dropping while stirring. Moreover, this mixed liquid was allowed to further react for 8 hours at 80° C. while stirring. Following the reaction, the liquid was cooled to 30° C. followed by dropping in a mixed liquid of 5.4 g of sodium hydroxide and 30.0 mL of methanol over the course of 5 minutes while stirring, and then allowed to further react for 20 minutes following completion of dropping while stirring. After removing the sodium chloride that formed by filtration, the reaction solvent was removed by distillation. The resulting solid was filtered and then washed with ethanol to obtain BHEP. The formation of BHEP was confirmed by $^{13}$C-NMR.

[Production Example of BHPP]

A mixed liquid of 20.0 g of 1-amino-2-propanol and 30.0 mL of ethanol was charged into a reaction vessel equipped with a stirrer, condenser and thermometer followed by raising the temperature to 30° C. with an oil bath. Next, a mixed liquid of 10.3 g of epichlorohydrin and 5.0 mL of ethanol was dropped into the aforementioned 1-amino-2-propanol solution over the course of 5 minutes while stirring, and allowed to react for 20 minutes following completion of dropping

TABLE 6

| | Amine compound | pKb | Wt % | Weakly acidic compound | pKa | Wt % | Eq/no. of amino groups | Water content (wt %) | Amt of oxalic acid after oxidative degradation test(μg) |
|---|---|---|---|---|---|---|---|---|---|
| Ex. 13 | EAE | 4.4 | 50.0 | Boric acid | 9.2 | 2.3 | 0.06 | 47.7 | 0.0 |
| Ex. 14 | MEA | 4.7 | 30.0 | Boric acid | 9.2 | 2.3 | 0.08 | 67.7 | 34.0 |
| Ex. 15 | MDEA | 5.7 | 50.0 | Boric acid | 9.2 | 2.3 | 0.09 | 47.7 | 37.9 |
| Comp. Ex. 12 | EAE | 4.4 | 50.0 | None | — | — | — | 50.0 | 437.0 |
| Comp. Ex. 13 | MEA | 4.7 | 30.0 | None | — | — | — | 70.0 | 42.3 |
| Comp. Ex. 14 | MDEA | 5.7 | 50.0 | None | — | — | — | 50.0 | 86.2 | while stirring. Moreover, this mixed liquid was allowed to further react for 8 hours at 80° C. while stirring. Following the reaction, the liquid was cooled to 30° C. followed by dropping in a mixed liquid of 4.5 g of sodium hydroxide and 30.0 mL of methanol over the course of 5 minutes while stirring, and then allowed to further react for 20 minutes following completion of dropping while stirring. After removing the sodium chloride that formed by filtration, the reaction solvent was removed by distillation. The resulting solid was filtered and then washed with ethanol to obtain BHPP. The formation of BHPP was confirmed by $^{13}$C-NMR.

[Production Example of HEHPP]

A mixed liquid of 10.0 g of monoethanolamine and 20.0 mL of ethanol was charged into a reaction vessel equipped with a stirrer, condenser and thermometer followed by raising the temperature to 30° C. with an oil bath. Next, a mixed liquid of 15.1 g of epichlorohydrin and 10.0 mL of ethanol was dropped into the aforementioned monoethanolamine solution over the course of 5 minutes while stirring, and allowed to react for 8 hours following completion of dropping while stirring. A mixed liquid of 12.3 g of 1-amino-2-propanol and 10.0 mL of ethanol was dropped into this mixed liquid over the course of 5 minutes while stirring and allowed to react for 20 minutes following completion of dropping while stirring. Moreover, this mixed liquid was allowed to further react for 8 hours at 80° C. while stirring. Following the reaction, the liquid was cooled to 30° C. followed by dropping in a mixed liquid of 6.5 g of sodium hydroxide and 30.0 mL of methanol over the course of 5 minutes while stirring, and then allowed to further react for 20 minutes following completion of dropping while stirring. After removing the sodium chloride that formed by filtration, the reaction solvent was removed by distillation. The resulting solid was filtered and then washed with ethanol to obtain HEHPP. The formation of HEHPP was confirmed by $^{13}$C-NMR.

* Production Example of Amine Compound for Comparative Examples

[Production Example of THPP]

A mixed liquid of 10.0 g of 1,3-diaminopropan-2-ol and 90.0 mL of water was charged into a reaction vessel equipped with a stirrer, condenser and thermometer followed by raising the temperature to 30° C. with an oil bath. Next, a mixed liquid of 32.2 g of propylene oxide and 10.0 mL of water were dropped into the aforementioned 1,3-diaminopropan-2-ol solution over the course of 5 minutes while stirring, and allowed to react for 20 minutes following completion of dropping while stirring. Moreover, this mixed liquid was allowed to further react for 8 hours at 80° C. while stirring. Following the reaction, the liquid was left to cool to room temperature followed by removing unreacted propylene oxide and the reaction solvent by distillation to obtain THPP. The formation of THPP was confirmed by $^{13}$C-NMR.

* Evaluation of Reactivity with Carbon Dioxide

Amine compounds were mixed with water to prepare aqueous amine solutions. At this time, the concentration of monoamine compounds having one amino group was adjusted to 1.81 mol/L, while the concentration of diamine compounds having two amino groups was adjusted to 0.91 mol/L. Carbon dioxide gas was blown into 25 mL aliquots of each aqueous amine solution for 15 minutes at 300 mL/min to allow the amine compound to react with the carbon dioxide. The reactions were carried out at temperatures of 30° C. and 90° C., and the reacted amount was calculated from element ratios of C and N before and after the reaction as measured with the Model TOC-VCP and Model TNM-1 Total Organic Carbon Analyzers (Shimadzu Corp.).

The absorbed amounts of carbon dioxide of each amine compound at 30° C. and 90° C. are shown in Table 7. The absorbed amounts are represented by the number of moles of carbon dioxide reacting with respect to 1 mole of amino group, or in other words, moles $CO_2$/moles N.

Figure 9C:
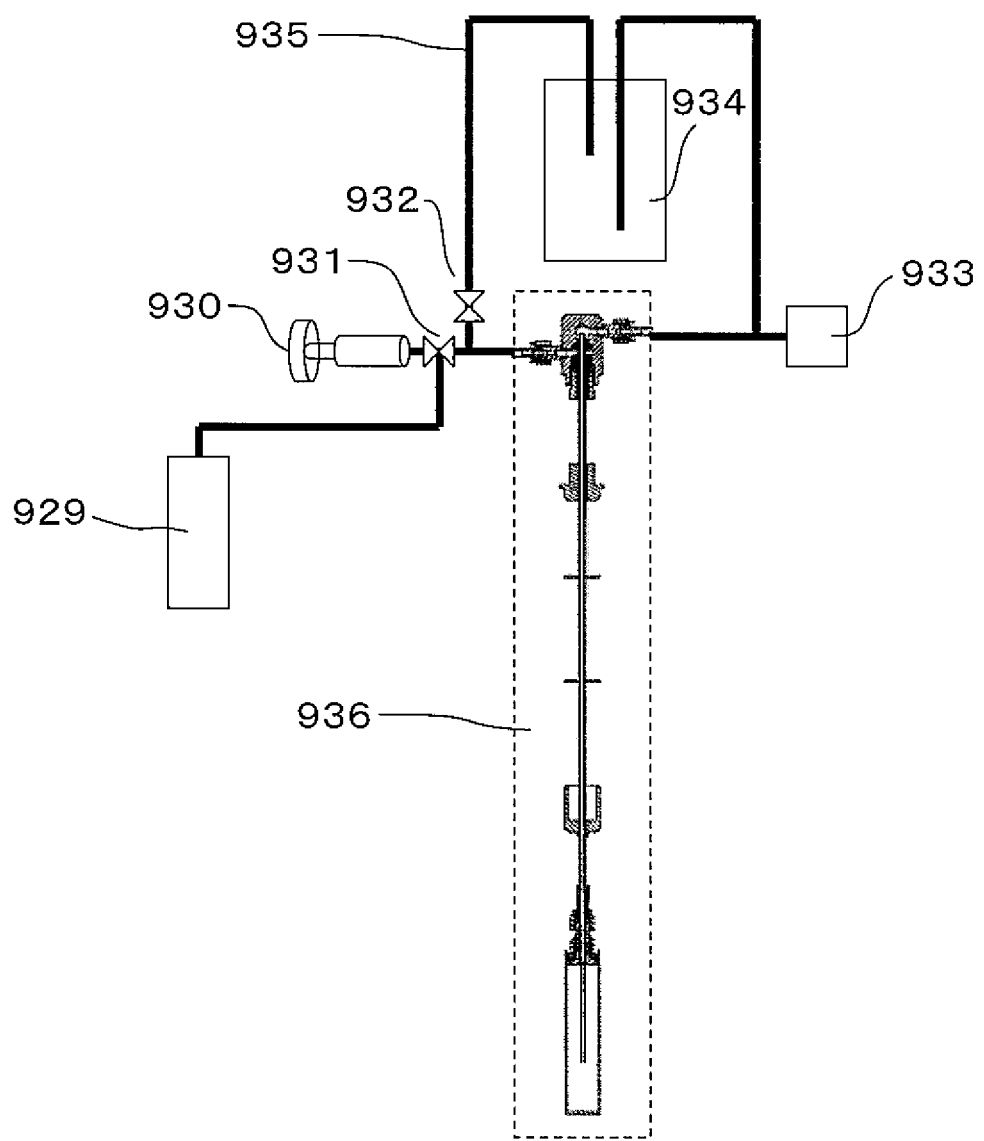
FIG. 9C is a schematic diagram of an apparatus for evaluating heat of reaction of an amine compound.

* Evaluation of Heat of Reaction Heat of reaction was measured using the apparatus shown in FIG. 9C with the Model C-80 Reaction calorimeter (Setaram Inc.) 936. A gas circulation normal pressure type cell (stainless steel 31/1415) was used for the cell, and the gas inlet port and outlet port were connected as shown in FIG. 9C. 4 g aliquots of each aqueous amine compound solution were placed in the cell after adjusting to the same concentrations as those used in the aforementioned evaluation of reactivity (1.64 mol/L in the case of monoamine compounds and 0.82 mol/L in the case of diamine compounds) and the cell was then placed in the C-80 Reaction calorimeter. The cell temperature was adjusted to 30° C. and allowed to stabilize. 50 mL of carbon dioxide were injected into a gas syringe 930 from carbon dioxide supplied from a carbon dioxide cylinder 929 by closing a valve 932 followed by opening the valve 932. The reacted amount was then measured based on the change in internal pressure measured with a pressure gauge 933 while measuring the amount of heat generated with the C-80 Reaction calorimeter. The amount of heat generated and reacted amount were calculated in advance using a calibration curve of heat of compression and internal pressure determined in the absence of a sample.

Evaluation Results

Table 7 indicates a comparison of performance when used as an amine compound for a carbon dioxide absorber. Those parameters evaluated as indicators of performance consisted of absorbed amount at 30° C., absorbed amount at 90° C. and heat of reaction. Furthermore, the difference between the absorbed amount at 30° C. and the absorbed amount at 90° C. was taken to represent carbon dioxide desorption performance. Values for heat of reaction are shown in Table 7 after converting to heat of reaction (kJ/mol) per 1 mole of reacted carbon dioxide using a calibration curve obtained when the reacted amount of the amino groups of each amine compound and carbon dioxide reached 0.10 mol $CO_2$/mol N.

TABLE 7

| | Amine compound | Amine compound structural formula | Absorbed amount at 30° C. (moles $CO_2$/moles N) | Absorbed amount at 90° C. (moles $CO_2$/moles N) | $CO_2$ desorption performance (moles $CO_2$/moles N) | Heat of reaction (kJ/mol) |
|---|---|---|---|---|---|---|
| Example 16 | BHEP | HO–CH$_2$CH$_2$–NH–CH$_2$–CH(OH)–CH$_2$–NH–CH$_2$CH$_2$–OH | 0.516 | 0.214 | 0.302 | 67.2 |

TABLE 7-continued

| | Amine compound | Amine compound structural formula | Absorbed amount at 30° C. (moles $CO_2$/moles N) | Absorbed amount at 90° C. (moles $CO_2$/moles N) | $CO_2$ desorption performance (moles $CO_2$/moles N) | Heat of reaction (kJ/mol) |
|---|---|---|---|---|---|---|
| Example 17 | HEHPP | HO-CH2CH2-NH-CH2-CH(OH)-CH2-NH-CH(CH3)-CH2-OH | 0.506 | 0.213 | 0.293 | 67.5 |
| Example 18 | BHPP | HO-CH(CH3)-CH2-NH-CH2-CH(OH)-CH2-NH-CH2-CH(CH3)-OH | 0.498 | 0.213 | 0.285 | 68.3 |
| Comp. Ex. 15 | DAP | $H_2N$-CH2-CH(OH)-CH2-$NH_2$ | 0.601 | 0.409 | 0.192 | 87.3 |
| Comp. Ex. 16 | THPP | bis(3,5-dihydroxypiperidinyl) propan-2-ol structure | 0.182 | 0.053 | 0.129 | 54.5 |
| Comp. Ex. 17 | EAE | HO-CH2CH2-NH-CH2CH3 | 0.631 | 0.279 | 0.352 | 87.0 |
| Comp. Ex. 18 | MEA | $H_2N$-CH2CH2-OH | 0.614 | 0.400 | 0.214 | 90.4 |

When a comparison is made between the amine compounds indicated in Examples 16 to 18 and the amine compounds indicated in Comparative Examples 15, 17 and 18 of Table 7, the amine compounds indicated in Examples 16 to 18 are superior in terms of heat of reaction with carbon dioxide. This is because the amine compounds indicated in Examples 16 to 18 have three hydroxyl groups and two amino groups interposing two carbon atoms, and the resulting structure in which they are arranged at symmetrical locations of the molecular structure has a significant effect. When a comparison is made between the amine compounds indicated in Examples 16 to 18 with the amine compound indicated in Comparative Example 16, the amine compounds indicated in Examples 16 to 18 are overwhelmingly superior in terms of the absorbed amount of carbon dioxide and desorption performance. This is the result of the amine compounds indicated in Examples 16 to 18 being secondary amines, while the amine compound indicated in Comparative Example 16 is a tertiary amine. The tertiary amine in the form of the amine compound indicated in Comparative Example 16 is unable to undergo a carbamate anion formation reaction in the reaction between amino groups and carbon dioxide, thereby resulting in a decrease in the absorbed amount of carbon dioxide. When considering the balance between carbon dioxide desorption performance and heat of reaction, the structures of the amine compounds indicated in Examples 16 to 18 are extremely superior as amine compounds for a carbon dioxide absorber.

The amine compound indicated in Example 16 of Table 7 is thought to demonstrate the previously described hydration effects due to the short terminal alkyl group, and the amine compound indicated in Example 16 is particularly superior as an amine compound for a carbon dioxide absorber.

Carbon Dioxide Absorbers of Second Configuration

Examples 19 to 26

Produced amine compounds, water and other components were mixed and dissolved in the ratios shown in Table 8 to prepare the carbon dioxide absorbers of Examples 19 to 26 and Comparative Examples 19 to 24.

TABLE 8

| | Composition of carbon dioxide absorber | | Ratio of each amine compound in amine | | | | Heat of reaction (kJ/g) | Released amount at 90° C. (g/L) |
|---|---|---|---|---|---|---|---|---|
| | Amine (wt %) | Water (wt %) | Compound A (wt %) | DEA (wt %) | Pz (wt %) | Other (wt %) | | |
| Ex. 19 | 50.0 | 50.0 | BHEP 42.8 | 50.6 | 6.6 | | 1.67 | 80.6 |
| Ex. 20 | 50.0 | 50.0 | BHEP 45.8 | 54.2 | | | 1.65 | 72.9 |
| Ex. 21 | 50.0 | 50.0 | BHEP 8.0 | 92.0 | | | 1.67 | 74.7 |
| Ex. 22 | 50.0 | 50.0 | BHEP 93.6 | | 6.4 | | 1.65 | 68.8 |
| Ex. 23 | 50.0 | 50.0 | BHEP 80.0 | | 20.0 | | 1.66 | 68.6 |
| Ex. 24 | 50.0 | 50.0 | BHEP 100.0 | | | | 1.58 | 66.8 |
| Ex. 25 | 50.0 | 50.0 | HEHPP 100.0 | | | | 1.59 | 65.4 |
| Ex. 26 | 50.0 | 50.0 | BHPP 100.0 | | | | 1.60 | 63.3 |
| Comp. Ex. 19 | 22.0 | 78.0 | | | | DAP 100.0 | 1.85 | 41.2 |

TABLE 8-continued

| | Composition of carbon dioxide absorber | | Ratio of each amine compound in amine | | | | Heat of reaction (kJ/g) | Released amount at 90° C. (g/L) |
|---|---|---|---|---|---|---|---|---|
| | Amine (wt %) | Water (wt %) | Compound A (wt %) | DEA (wt %) | Pz (wt %) | Other (wt %) | | |
| Comp. Ex. 20 | 50.0 | 50.0 | | | | THPP 100.0 | 1.25 | 13.5 |
| Comp. Ex. 21 | 44.0 | 56.0 | | | | EAE 100.0 | 1.86 | 76.2 |
| Comp. Ex. 22 | 44.0 | 56.0 | | | 7.3 | EAE 92.7 | 1.82 | 74.7 |
| Comp. Ex. 23 | 44.0 | 56.0 | | 54.1 | | EAE 45.9 | 1.78 | 68.8 |
| Comp. Ex. 24 | 30.0 | 70.0 | | | | MEA 100.0 | 1.93 | 46.2 |

\* Evaluation of Released Amount of Carbon Dioxide

The method used to evaluate the released amount of carbon dioxide of carbon dioxide absorbers of the second configuration is the same as the method used to evaluate the released amount of carbon dioxide of carbon dioxide absorbers of the first configuration as previously described.

Furthermore, absorption of carbon dioxide was carried out for 30 minutes at 30° C., while release of carbon dioxide was carried out for 20 minutes after heating to 90° C. The released amounts shown in Table 8 are shown in g/L by converting based on the number of grams of carbon dioxide released in the case of using 1 L of absorber.

\* Evaluation of Heat of Reaction

The method used to evaluate heat of reaction of carbon dioxide absorbers of the second configuration is the same as the method used to evaluate heat of reaction of carbon dioxide absorbers of the first configuration as previously described.

\* Evaluation Results

Table 8 shows a comparison of performance during use as a carbon dioxide absorber. Performance was evaluated based on heat of reaction of the carbon dioxide absorbers listed in Table 8 and released amount of carbon dioxide at 90° C.

When a comparison is made between the carbon dioxide absorbers indicated in Examples 19 to 26 of Table 8 and the carbon dioxide absorbers indicated in Comparative Example 19 and Comparative Examples 21 to 24, the carbon dioxide absorbers indicated in Examples 19 to 26 are superior in terms of heat of reaction. This is an effect of the carbon dioxide absorbers indicated in Examples 19 to 26 containing Compound A. In addition, when the carbon dioxide absorbers of Examples 19 to 26 are compared with the carbon dioxide absorber indicated in Comparative Example 20, the carbon dioxide absorbers indicated in Examples 19 to 26 that contain Compound A are overwhelmingly superior in terms of the released amount of carbon dioxide. Since the performance of a carbon dioxide absorber is determined based on the balance between heat of reaction and released amount of carbon dioxide, the carbon dioxide absorbers indicated in Examples 19 to 26 are superior to the carbon dioxide absorbers indicated in Comparative Examples 19 to 24 as carbon dioxide absorbers.

In the carbon dioxide absorbers shown in Table 8, the balance between heat of reaction and released amount of carbon dioxide was determined to be even more superior as carbon dioxide absorbers when Pz and/or DEA is suitably contained in addition to BHEP.

Examples of Use of Antioxidant

Examples 27 to 30

Effects on oxygen were evaluated using BHEP for the amine compound of the present invention. As shown in Table 9, absorbers containing antioxidant and absorbers not containing antioxidant were prepared, and the amount of oxalic acid formed following oxidative degradation was evaluated using the same method as that used in evaluation of the first configuration. Furthermore, in Table 9, the amount of antioxidant added refers to the ratio of antioxidant added with respect to carbon dioxide absorber.

TABLE 9

| | Composition of carbon dioxide absorber | | | Composition of antioxidant | | Amount of oxalic acid formed after thermal degradation (μg) |
|---|---|---|---|---|---|---|
| | Amine composition (wt %) | Amount of amine (wt %) | Water content (wt %) | Antioxidant | Added amount | |
| Ex. 27 | BHEP | 40.0 | 60.0 | 2-mercaptobenzothiazole | 1000 ppm | 0.0 |
| Ex. 28 | 40.0 | | | 2-mercaptobenzoimidazole | 1000 ppm | 0.0 |
| Ex. 29 | | | | Bismuthiol | 1000 ppm | 0.0 |
| Ex. 30 | | | | None | — | 92.8 |

According to Table 9, the addition of a known antioxidant was able to be confirmed to make it possible to suppress oxidative degradation even in absorbers using BHEP for the amine compound. In addition, in the case of comparing the result (437.0 μg) for the known secondary amine EAE (Comparative Example 12) with the result (92.8 μg) for Example 30, BHEP was able to be confirmed to not be an amine compound that is easily oxidized.

Carbon Dioxide Absorbers of First Configuration Using Compound A

Examples 31 to 35

A plurality of amine compounds, boric acid and water were mixed and dissolved in the ratios shown in Table 10 to prepare carbon dioxide absorbers of Examples 31 to 35. In addition, these carbon dioxide absorbers were evaluated for heat of reaction, released amount of carbon dioxide at 90° C. and the ratio of (absorbed amount 15 minutes after start of absorption)/(absorbed amount after 30 minutes) as an indicator of absorption rate in accordance with the previously described methods.

TABLE 10

| | Composition of carbon dioxide absorber | | | Ratio of each amine compound among plurality of amine compounds | | | | Eq/no. of amino groups | Heat of reaction (kJ/g) | Released amount at 90° C. (g/L) | 15 min absorbed amt/30 min absorbed amt |
|---|---|---|---|---|---|---|---|---|---|---|---|
| | Amine compound (wt %) | Boric acid (wt %) | Water (wt %) | Compound A (wt %) | DEA (wt %) | Pz (wt %) | Other (wt %) | | | | |
| Example 31 | 41.0 | 2.5 | 56.5 | BHEP 82.9 | | 17.1 | | 0.07 | 1.54 | 77.1 | 0.91 |
| Example 32 | 43.0 | 2.0 | 55.0 | BHEP 79.1 | | 20.9 | | 0.05 | 1.60 | 78.3 | 0.95 |
| Example 33 | 48.8 | 2.3 | 48.9 | BHEP 42.8 | 50.6 | 6.6 | | 0.07 | 1.63 | 80.1 | 0.94 |
| Example 34 | 48.8 | 2.5 | 48.7 | BHEP 46.0 | | 7.0 | 2A13PD 47.0 | 0.07 | 1.69 | 80.0 | 0.91 |
| Example 35 | 48.7 | 2.5 | 48.8 | BHEP 46.4 | | 7.1 | EAE 46.5 | 0.07 | 1.66 | 77.3 | 0.93 |

According to Table 10, absorbers of the first configuration that used Compound A were able to be confirmed to be extremely preferable absorbers that have low heat of reaction and release a large amount of carbon dioxide at comparatively low temperatures. In addition, as a result of evaluating the degree of oxidative degradation of the absorber used in Example 33 using the same method as previously described, the amount of oxalic acid in the absorber following the degradation test was able to be confirmed to be extremely low at 18.6 μg.

INDUSTRIAL APPLICABILITY

The present invention is able to provide a carbon dioxide absorber for separating carbon dioxide contained in a gas by absorbing the carbon dioxide followed by the release thereof, and more specifically, a carbon dioxide absorber can be provided for stably separating carbon dioxide while saving energy. In addition, the present invention is also able to provide a method for separating carbon dioxide from a gas containing carbon dioxide in the manner of combustion exhaust gas as well as a separation and recovery apparatus.

BRIEF DESCRIPTION OF THE REFERENCE SYMBOLS

11 Absorption tower
12 Nozzle
13 Lower packed portion
14 Exhaust gas supply port
15 Carbon dioxide absorber circulation pump
16 Cooler
17 Carbon dioxide absorber circulation pump
18 Heat exchanger
19 Carbon dioxide-free gas exhaust port
110 Regeneration heater
111 Lower packed portion
112 Nozzle
113 Circulating water pump
114 Gas-liquid separator
115 Recovered carbon dioxide discharge line
116 Regeneration tower reflux condenser
117 Regeneration tower
21 Regeneration heater
22 Regeneration heater
31 Heat pump high-pressure side, high-temperature coolant
32 Heat pump compressor
33 Heat pump pressure reducer
34 Heat pump heat source
35 Heat exchanger for heating heat pump low-pressure side, low-temperature coolant
41 Post-heat recovery heat pump low-pressure side, low-temperature coolant
42 Pre-heat recovery heat pump low-pressure side, low-temperature coolant
43 Heat exchanger for heating heat pump low-pressure side, low-temperature coolant
51 Post-heat recovery heat pump low-pressure side, low-temperature coolant
52 Pre-heat recovery heat pump low-pressure side, low-temperature coolant
61 Regeneration heater using low-temperature heat source
62 Regeneration heater using high-temperature heat source
91 Cylinder
92 Gas syringe
93 Three-way valve
94 Check valve
95 Ball valve
96 Ball valve
97 Ball valve
98 Tedlar bag
99 Infrared carbon dioxide concentration meter
910 SUS line (φ6 mm)
911 Gas circulation pump
912 Gas flow meter
913 Oil bath
914 Gas scrubbing bottle (glass, 25 mL)
915 Condenser
916 Flow rate regulating valve
917 Gas flow meter
918 Air supply pump
919 Gas scrubbing bottle (glass, 250 mL)
920 Absorber (50 g)
921 Three-mouth flask (glass, 100 mL)
922 Oil bath
923 Liquid circulation pump
924 Jacketed glass tube 925 Heater
926 Water circulation pump
927 Packing material
928 Condenser
929 Cylinder
930 Gas syringe
931 Three-way valve
932 Ball valve
933 Pressure gauge
934 Screw cap bottle (250 mL)
935 SUS line (φ6 mm)
936 C-80 cell

The invention claimed is:

1. A carbon dioxide absorber containing an amine compound, a weakly acidic compound and water;
wherein, the amine compound at least includes an amine compound represented by the following general formula (I):

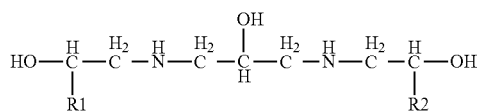

wherein, $R^1$ and $R^2$ represent hydrogen atoms or alkyl groups having 1 to 4 carbon atoms,
the weakly acidic compound is a boric acid or a borate ester having a pKa value of 7.0 to 10.0 in an aqueous solution at 30° C., and
the weakly acidic compound is present in an amount within the range of 0.01 equivalents to 1.50 equivalents with respect to amino groups of the amine compound.

2. The carbon dioxide absorber according to claim 1, wherein the pH of the carbon dioxide absorber at 30° C. is 8.5 to 11.0.

3. The carbon dioxide absorber according to claim 1, wherein the content of the boric acid or the borate ester is within the range of 0.05 equivalents to 0.30 equivalents with respect to amino groups of the amine compound.

4. The carbon dioxide absorber according to claim 3, wherein 25% to 99% of the boric acid neutralizes amino groups of the amine compound.

5. The carbon dioxide absorber according to claim 1, wherein a compound having a pKb value in an aqueous solution at 30° C. of less than 4.0 is not contained.

6. The carbon dioxide absorber according to claim 1, wherein the amine compound has a primary and/or secondary amino group.

7. The carbon dioxide absorber according to claim 1, wherein the content of the amine compound is 30% by mass to 55% by mass, and the amount of the water is 40% by mass or more.

8. The carbon dioxide absorber according to claim 1, further containing 1.0% by mass to 6.0% by mass of piperazine and/or 2-methylpiperazine, and containing the weakly acidic compound within the range of 0.5 moles to 2.0 moles with respect to 1 mole of the piperazine and/or 2-methylpiperazine.

9. The carbon dioxide absorber according to claim 1, further containing diethanolamine.

10. The carbon dioxide absorber according to claim 1, wherein both $R^1$ and $R^2$ in the formula are hydrogen atoms.

11. A carbon dioxide absorber containing water and an amine that at least includes an amine compound represented by the following general formula (I):

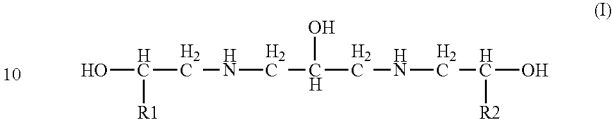

(wherein, $R^1$ and $R^2$ represent hydrogen atoms or alkyl groups having 1 to 4 carbon atoms).

12. The carbon dioxide absorber according to claim 11, wherein both $R^1$ and $R^2$ in the formula are hydrogen atoms.

13. The carbon dioxide absorber according to claim 11, containing the amine at 5.0% by mass to 80.0% by mass and containing water at 20.0% by mass to 95.0% by mass.

14. The carbon dioxide absorber according to claim 13, wherein the amine contains diethanolamine at 20.0% by mass to 70.0% by mass in the amine.

15. The carbon dioxide absorber according to claim 13, wherein the amine contains piperazine and/or 2-methylpiperazine at 1.0% by mass to 15.0% by mass in the amine.

16. The carbon dioxide absorber according to claim 13, wherein the amine contains diethanolamine at 20.0% by mass to 65.0% by mass and contains piperazine and/or 2-methylpiperazine at 1.0% by mass to 15.0% by mass in the amine.

17. The carbon dioxide absorber according to claim 1 or 11, further containing an antioxidant.

18. The carbon dioxide absorber according to claim 17, wherein the antioxidant is a secondary antioxidant having one or more thiol groups.

19. A method for regenerating a carbon dioxide absorber, comprising following steps:
absorbing carbon dioxide into the carbon dioxide absorber described in claim 1 or 11, and
releasing the carbon dioxide by heating the carbon dioxide absorber.

20. A method for separating and recovering carbon dioxide, comprising following steps:
absorbing carbon dioxide by contacting a gas containing carbon dioxide with the carbon dioxide absorber according to claim 1 or 11, and
regenerating the carbon dioxide absorber by releasing the carbon dioxide by subsequently heating the carbon dioxide absorber.

21. A carbon dioxide absorber containing an amine compound, a weakly acidic compound and water;
wherein,
the amine compound at least includes an amine compound represented by the following general formula (I):

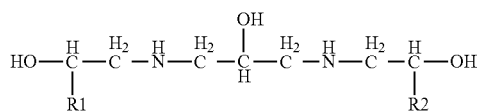

wherein, $R^1$ and $R^2$ represent hydrogen atoms or alkyl groups having 1 to 4 carbon atoms,
the weakly acidic compound is a boric acid or a borate ester, the weakly acidic compound is present in an amount within the range of 0.05 equivalents to 0.30 equivalents with respect to amino groups of the amine compound, and wherein a compound having a pKb value in an aqueous solution at 30° C. of less than 4.0 is not contained.

* * * * *